(12) United States Patent
Matsuura et al.

(10) Patent No.: US 7,798,655 B2
(45) Date of Patent: Sep. 21, 2010

(54) PROJECTION UNIT AND PROJECTION TYPE IMAGE DISPLAY APPARATUS

(75) Inventors: Atsushi Matsuura, Sakai (JP); Shinichi Suzuki, Izumi (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 576 days.

(21) Appl. No.: 11/823,244

(22) Filed: Jun. 27, 2007

(65) Prior Publication Data

US 2008/0013055 A1 Jan. 17, 2008

(30) Foreign Application Priority Data

Jun. 30, 2006 (JP) ............................. 2006-180718
Sep. 6, 2006 (JP) ............................. 2006-241538
Dec. 26, 2006 (JP) ............................. 2006-350055

(51) Int. Cl.
*G03B 21/28* (2006.01)
(52) U.S. Cl. ................. 353/99; 353/98; 353/52; 353/56; 353/64; 353/69; 353/73; 353/77; 353/78; 353/119; 359/871; 359/872; 359/873; 359/881; 348/E5.137; 348/E5.143; 348/E5.144; 348/E5.012

(58) Field of Classification Search .............. 353/52, 353/56, 64, 69, 73, 77, 78, 98, 99, 119; 359/871, 359/872, 873, 881; 348/E5.137, E5.142, 348/E5.143, E5.144, E9.012
See application file for complete search history.

(56) References Cited

U.S. PATENT DOCUMENTS

| 6,527,397 | B2 * | 3/2003 | Furuichi et al. | ............. 353/119 |
| 7,029,131 | B2 | 4/2006 | Furuichi | ..................... 353/98 |
| 2006/0007556 | A1 | 1/2006 | Okajima et al. | ............. 359/649 |

FOREIGN PATENT DOCUMENTS

| JP | 2004-53658 A | 2/2004 |
| JP | 2004-258478 A | 9/2004 |

* cited by examiner

*Primary Examiner*—Georgia Y Epps
*Assistant Examiner*—Sultan Chowdhury
(74) *Attorney, Agent, or Firm*—Sidley Austin LLP

(57) ABSTRACT

A projection unit 17 effectively corrects out of focus due to a temperature rise. A mirror holding mechanism of a concave mirror 25 has a mirror holder 41 and a mirror holder base 42. The concave mirror 25 is slidably housed in the mirror holder 41. A focus correction member 57, which expands by heat, is disposed between a back face of the concave mirror 25 and reference plane S formed in the mirror holder. The concave mirror 25 and the focus correction element 57 are urged to the reference plane S by a mirror retainer spring 59.

20 Claims, 17 Drawing Sheets

(12)  United States Patent

PROJECTION UNIT AND PROJECTION TYPE IMAGE DISPLAY APPARATUS

RELATED APPLICATION

This application is based on Japanese Patent Applications No. 2006-180718, 2006-241538, and 2006-350055 the contents in which are incorporated herein by reference.

BACKGROUND OF THE INVENTION

The present invention relates to a projection unit for reflecting an image light, modulated by an image formation device, by a plurality of mirrors for performing enlarged projection.

U.S. Pat. No. 7,029,131 discloses a configuration of a projection unit for correcting the changes of a focal position (out of focus) due to a temperature rise (see FIG. 23). Specifically, a linear expansion coefficient of an inverted L-shaped holder 2, which is holding a mirror 1, is set to be greater than the linear expansion coefficient of a base 3 where the holder 2 is secured on the top portion 2a. By offsetting the expansion of the base 3 (arrow A) by thermal expansion with the displacement of the mirror 1 (arrow B) by thermal expansion of the holder 2, the distance C between the mirror 1 and the image formation device 4 is maintained to be constant even when temperature rises.

However, in the case of the configuration of U.S. Pat. No. 7,029,131, it is difficult to correct out of focus effectively. In order to correct out of focus, it is preferable that the linear expansion coefficient of the holder 2 is sufficiently greater than the linear expansion coefficient of the mirror 1. However, a material with a high linear expansion coefficient has low rigidity, so in terms of securing strength, a material with a true high linear expansion coefficient cannot be used as a material of the holder 2. As a result, with the configuration disclosed in U.S. Pat. No. 7,029,131, correcting out of focus when temperature rises is quantitatively insufficient, and out of focus inevitably remains.

In the case of the configuration disclosed in U.S. Pat. No. 7,029,131, in which the top portion 2a of the inverted L-shaped holder 2 is secured to the base 3, as mentioned above, the mirror 1 tends to become shaky due to vibration.

Also in the case of the configuration in U.S. Pat. No. 7,029,131 distance D from the position, where the holder 2 is secured to the base 3, to the center axis CL of the mirror 1, is relatively long, so the displacement of mirror 1 tends to occur in a vertical direction (direction perpendicular to the center axis CL of the mirror 1) when temperature rises.

SUMMARY OF THE INVENTION

It is an object of the present invention to provide a projection unit which can effectively correct out of focus due to a temperature change of the projection unit, and does not cause other problems, such as shakiness of a mirror and displacement other than displacement causing out of focus.

A first aspect of the present invention provides a projection unit for enlarging and projecting an image light modulated by an image formation device comprising: a plurality of curved mirrors for reflecting the image light, a plurality of mirror holding mechanisms for holding the individual curved mirror respectively, a projection base on which the mirror hold mechanisms are installed, a reference plane for the mirror holding mechanism of one of the curved mirrors to be correction target, the reference plane being positioned with respect to the projection base and extending in a direction crossing a center axis of the curved mirror, and a thermal deformation member of which shape changes by a temperature rise, so that the curved mirror or a mirror holding member for holding the curved mirror is displaced to be distant from the reference plane by the change of the shape.

The curved mirror is displaced, not by the thermal expansion of the mirror holding member for holding the curved mirror, but by the change of form of the thermal deformation member, which is a different member from the mirror holding member, due to a temperature rise, and out of focus is corrected by this displacement of the curved mirror. Since the structure and material of the thermal deformation member are not limited in terms of securing strength, such characteristics as the linear expansion coefficient of the thermal deformation member can be set so as to secure the required correction amount, and out of focus can be effectively corrected. The thermal deformation member displaces the curved mirror with respect to the reference plane, which is extended in a direction crossing the center axis thereof, so displacement of the curved mirror generated in the direction crossing the center axis at a temperature increase can be prevented.

It is preferable that the correction target curved mirror is disposed facing the image formation device. By using the curved mirror disposed closest to the image formation device as the correction target, out of focus can be corrected while minimizing the influence on other optical performances.

It is preferable that the image formation device is installed on the projection base. Since the curved mirror and the image formation device are installed on the same projection base, displacement amount, due to thermal expansion, can be estimated at higher precision compared with the case of installing the curved mirror and the image formation device on separate members respectively. As a result, the correction amount, based on the deformation of the thermal deformation member, can be set at high accuracy to an appropriate value whereby out of focus can be effectively corrected.

Specifically, projection unit further comprises an urging member for urging the curved mirror to a back face side of the curved mirror toward the reference plane. The mirror holding member comprises a guide tube portion for slidably holding the curved mirror on an inner face thereof, and the reference plane facing the back face of the curved mirror held by the guide tube portion. The thermal deformation member is disposed between the back face of the curved mirror and the reference plane. The urging member urges the curved mirror and the thermal deformation member to the reference plane. This is a configuration where the reference plane is formed in the mirror holding member, and the thermal deformation member is disposed inside the mirror holding member, so out of focus at a temperature rise can be corrected with a minimum number of composing elements. Since the curved mirror is held inside the guide tube portion of the mirror holding member, the curved mirror can be secured to the projection base in a stable status where the curved mirror is not shaken very much by vibration, and displacement other than displacement causing out of focus hardly occurs.

It is also preferable that the thermal deformation member comprises a mirror hosing portion which is disposed in the mirror holding member and houses the curved mirror, and a main portion which extends from the mirror hosing portion to the back face side of the curved mirror. The mirror holding member comprises a guide tube portion for slidably holding the mirror hosing portion of the thermal deformation member on an inner face thereof, and the reference plane facing the back face of the curved mirror. The thermal deformation member is disposed in the mirror holding member so that the main portion is disposed between the mirror housing portion and the reference plane. The urging member urges the curved mirror and the thermal deformation member to the reference plane. The guide tube portion of the mirror holding member slidably guides the mirror hosing portion of the thermal deformation member housing the curved mirror. Therefore compared with the structure where the guide tube portion of the mirror holding member directly guides the curved mirror itself, this structure is less shaky, and has good reproducibility of the displacement amount of the curved mirror when a temperature rise is repeated. The reproducibility of the displacement amount of the curved mirror, when a temperature rise is repeated, is good, because the movable curved mirror is not urged by the thermal deformation member at a temperature rise, but by the curved mirror housed in the thermal deformation member (mirror hosing portion) itself. Also the curved mirror is held inside the guide tube portion of the mirror holding member via the mirror hosing portion of the thermal deformation member, so the curved mirror can be secured to the projection base in a stable status where the curved mirror is not shaken very much by vibration, and displacement other than displacement causing out of focus hardly occurs.

It is also preferable that the projection unit further comprises at least three rod members each of which comprises an axis portion which has a first external dimension, of which one end is secured to the projection base side, and which extends to the back face side of the curved mirror, and an enlarged portion which is disposed at the other end of the axis portion, which has a second external dimension larger than the first dimension, and on which the reference plane is formed. The mirror holding member, on which the curved mirror is secured, is slidably inserted through the axis portion of the rod member. The thermal deformation member is inserted through the axis portion of the rod member between the mirror holding member and the reference plane. The urging member urges the mirror holding member and the thermal deformation member to the reference plane. The mirror holding member, in which the curved mirror is secured, is slidably supported by the axis portions of three or more rod members. Therefore compared with the structure of slidably supporting the curved mirror itself, this structure is less shaky and has good reproducibility of the displacement amount of the curved mirror when a temperature rise is repeated. Furthermore, when the temperature is raised, the curved mirror is displaced, with the mirror holding member being urged by the thermal deformation member to move along axis portion. The reproducibility of the displacement quantity of the curved mirror when a temperature rise is repeated is also good because the curved mirror itself is not directly urged by the thermal deformation member. Since the mirror holding member in which the curved mirror is secured is supported by three or more rod members, the curved mirror can be secured to the projection base in a stable status where the curved mirror is not shaken very much by vibration, and displacement other than displacement causing out of focus hardly occurs.

Specifically, the mirror holding mechanism comprises an installation member which is directly installed on the projection base. The rod member is a male screw of which thread is the axis portion and screw head is the enlarged portion. The thread of the male screw is engaged into a female screw formed in the installation member. The male screw can be moved back and forth on the installation member by rotating the male screw, and by this a position of the screw head (enlarged portion), that is a position of the reference plane, can be changed. By changing the position of each reference plane, the inclination of the mirror holding member changes. Therefore the inclination of the curved mirror can be adjusted merely by adjusting the male screw.

It is preferable that the projection unit further comprises a first displacement restriction portion for restricting displacement in a direction crossing the axis line of the axis portion by one end of the thermal deformation member of which inner face closely and externally fits to the enlarged portion side of the axis portion of the rod member, and of which outer face is inserted through the axis portion. If the rod member inclines with the portion secured to the projection base side as a fulcrum due to vibration, displacement (shakiness) is generated at a portion connecting the axis portion of the rod member and the enlarged portion in a direction crossing the axis line of the axis portion. By this displacement, the position of the mirror holding member, with respect to the projection base, shifts, so the position of the curved mirror shifts. As a result, the reproducibility of the displacement amount of the curved mirror, when a temperature rise is repeated, decreases. However by installing the first displacement restriction portion, the displacement of the wide diameter side of the axis portion of the rod member is restricted by one end of the thermal deformation member, so the inclination of the rod member to the projection base side, with the secured portion as a fulcrum, can be prevented, and displacement of the curved mirror due to shakiness caused by this inclination can be eliminated.

The first displacement restriction portion may be a member separate from the rod member or the thermal deformation member, or may be integrated with the thermal deformation member. If the first displacement restriction portion is integrated with the thermal deformation member, the increase of composing elements by adding a first displacement restriction portion can be avoided.

It is preferable that the mirror holding member further comprises a second displacement restriction portion for restricting displacement of the other end of the thermal deformation member in a direction crossing the axis line. By installing the second displacement restriction portion in the mirror holding member, displacement of the thermal deformation member in a direction crossing the axis line can be prevented, and a drop in reproducibility of the displacement amount of the curved mirror due to this displacement when a temperature rise is repeated and the displacement of the curved mirror can be avoided. Particularly by installing both the above mentioned first displacement restriction portion and this second displacement restriction portion, the inclination of the rod member toward the projection base side with the secured portion as a fulcrum can be more effectively prevented.

In the case of the structure of installing three or more rod members, it is preferable that a deformation quantity with respect to a temperature rise is different between at least two of the thermal deformation members. If the deformation amount, with respect to the temperature rise, is different between the thermal deformation members, the inclination or orientation of the mirror holding member, in which the curved mirror is secured at a temperature rise, changes from the inclination and orientation before a temperature rise. Therefore by appropriately setting the deformation amount of the individual thermal deformation member at a temperature rise, not only can out of focus be corrected but also astigmatism, and the displacement of the image projected onto the screen can be corrected. For example, by constructing the thermal deformation members by material of which thermal deformation characteristics, such as the linear expansion coefficient, are different, the deformation amount with respect to a temperature rise can be changed among the thermal deformation members. The deformation amount with respect to a temperature rise can also be changed among the thermal deformation members by changing the length, even if the thermal deformation characteristics, such as linear expansion coefficient, are the same.

It is preferable that the thermal deformation member is made of a material of which linear expansion coefficient is $8 \times 10^{-5}$ (1/K) or more and $15 \times 10^{-5}$ (1/K) or less. Examples of materials appropriate for the thermal deformation member having a linear expansion coefficient in this range are such material having a relatively high thermal expansion as polyacetal resin (POM) and polybutylene telephthalate resin (PBT). The linear expansion coefficient of POM is $8.1 \times 10^{-5}$ (1/K) or more and $11 \times 10^{-5}$ (1/K) or less, and the linear expansion coefficient of PBT is $9 \times 10^{-5}$ (1/K) or more and $13 \times 10^{-5}$ (1/K) or less.

The thermal deformation member may be a bimetal. If a bimetal is used for the thermal deformation member, the deformation amount of the thermal deformation member, with respect to a temperature rise, can be increased. In other words, even if the size of the thermal deformation member is relatively small, sufficient deformation amount can be implemented at a temperature rise. Therefore by using a bimetal for the thermal deformation member, the thermal deformation member can be more compact and slim, and the mirror holding mechanism and the projection unit can be more compact and slim accordingly.

A second aspect of the present invention provides projection type image display apparatus comprising, the projection unit of the first aspect, an image formation device for modulating an image light to be enlarged and projected by the projection unit, and an illumination unit for irradiating an illumination light onto the image formation device.

BRIEF DESCRIPTION OF THE DRAWINGS

These and other objects and features of the invention will become apparent from the following description taken in conjunction with preferred embodiments of the invention with reference to the accompanying drawings, in which.

DESCRIPTION OF THE PREFERRED EMBODIMENTS

First Embodiment

Figure 1:
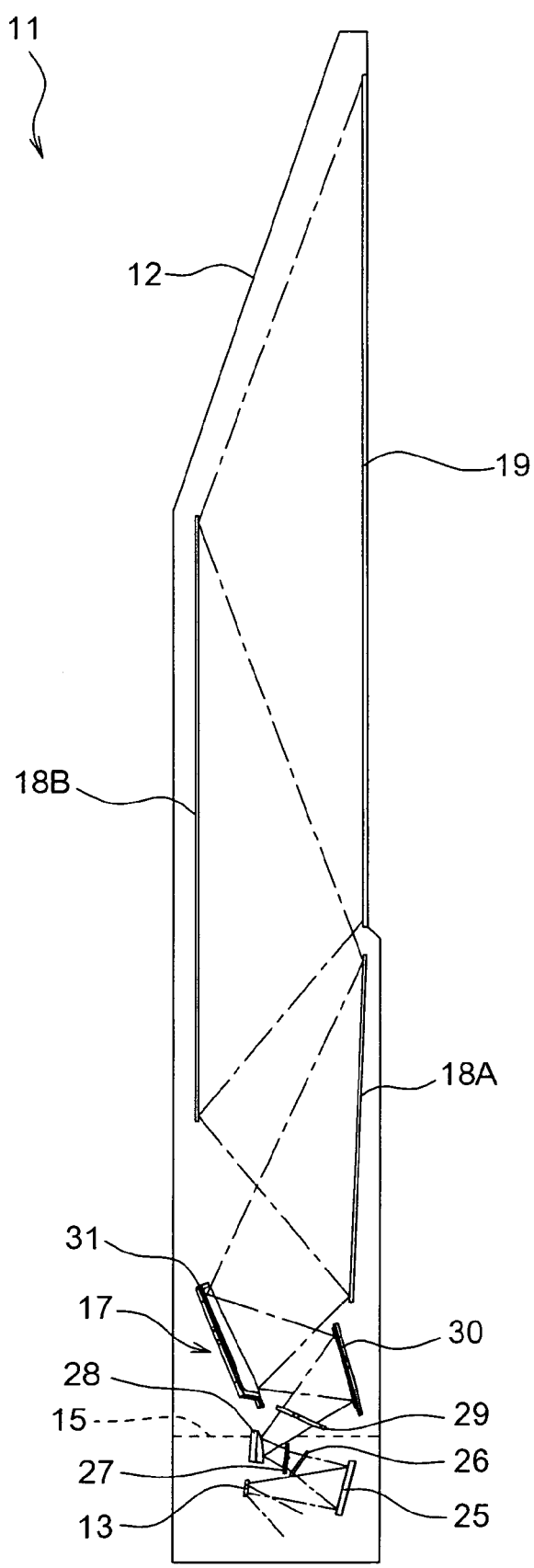
FIG. 1 is a diagram depicting a rear projection television having a projection unit according to a first embodiment of the present invention.

FIG. 1 shows a rear projection television (Rear Pro TV) 11 as an example of a projection type image display apparatus having a projection unit according to a projection unit according to a first embodiment of the present invention. In a casing 12 of Rear Pro TV 11, a digital micro mirror device (DMD) 13, which is an example of a reflection type image formation device, a illumination unit 15 for irradiating an illumination light onto the DMD 13, and a projection unit 17 for enlarging and projecting an image light modulated by the DMD 13 are housed. And at the top of the front face of the casing 12, a screen 19, where an image enlarged by the projection unit 17 is projected via two plane mirrors 18A and 18B, is installed.

Figure 2:
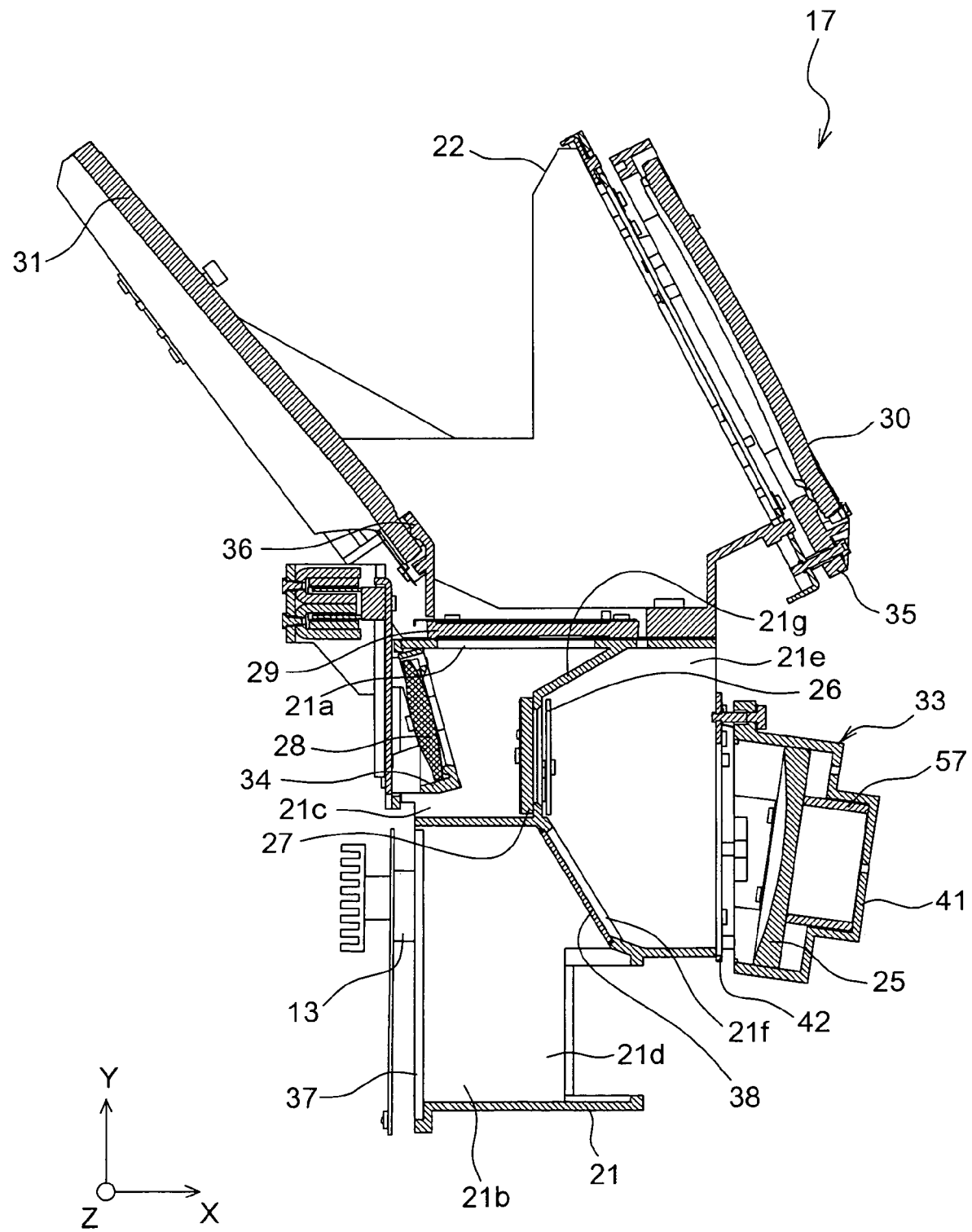
FIG. 2 is a longitudinal sectional view depicting a projection unit.

As FIG. 2 shows, the projection unit 17 has a lower projection base 21 and an upper projection base 22 as pedestals for supporting various optical elements and the DMD 13. The upper projection base 22 is mounted on the lower projection base 21. Optical elements of the projection unit 17 are four curved mirrors 25, 28, 30 and 31, two aberration correction plates 27 and 29, and one variable stop mechanism 26. Specifically, the concave mirror 25, variable stop mechanism 26, first aberration correction plate 27, convex mirror 28, second aberration correction plate 29, first free-form curved mirror 30 and second free-form curved mirror 31 are disposed sequentially from the DMD 13 side, and an image light modulated by the DMD 13 is guided to the screen 19 side of this sequence. In the present embodiment, the curved mirror 25 is a spherical mirror, and the convex mirror 28 is a rotation-symmetric aspherical mirror. The first free-form curved mirror 30 is a concave mirror, and the second free-form curved mirror 31 is a convex mirror. The first and second aberration correction plates 27 and 29 hardly have any optical power. Out of these optical elements of the projection unit 17, the concave mirror 25, variable stop mechanism 26, first aberration correction plate 27, convex mirror 28 and second aberration correction plate 29 are installed on the lower projection base 21, and the first and second free-form curved mirrors 30 and 31 are installed on the upper projection base 22. The four curved mirrors 25, 28, 30 and 31 are held by the mirror holding mechanisms 33, 34, 35 and 36 respectively, and these mirror holding mechanisms 33 to 36 are installed on the upper or lower projection bases 21 and 22.

The lower projection base 21 is a single member, which has an opening 21a at the top, and two openings 21b to 21e disposed in the vertical direction at the left and right ends respectively. In FIG. 2, the DMD 13 is installed in the opening 21b at the lower left side. Specifically, a holding plate 37 holding the DMD 13 is secured on the lower projection base 21 so as to close the opening 21b. The mirror holding mechanism 33 for holding the concave mirror 25 is installed on the lower projection base 21 so as to close the opening 21e at the upper right side in FIG. 2. Also the mirror holding mechanism 34 for the convex mirror 28 is installed on the lower projection base 21 so as to close the opening 21c above the DMD 13. In a partition 21f between the opening 21b where the DMD 13 is installed and the opening 21e where the concave mirror 25 is installed, a cover glass 38 for preventing dust is inserted. In a partition 21g between the opening 21e where the concave mirror 25 is installed and the opening 21c where the convex mirror 28 is installed, the variable stop mechanism 26 and the first aberration correction plate 27 are installed. In the opening 21d at the bottom of the concave mirror 25, an entrance lens, which is not illustrated, is installed, and the light from the illumination unit 15 enters the DMD 13 via the entrance lens.

The upper projection base 22 is also a single member. On the base of the upper projection base 22 mounted on the lower projection base 21, the second aberration correction plate 29 is installed so as to close the opening 21a of the lower projection base 21.

In the present embodiment, a mechanism for correcting out of focus at a temperature change is installed in the mirror holding mechanism 33 of the concave mirror 25. Now a mirror holding mechanism 33 of the concave mirror 25 will be described in detail. A rectangular coordinate system in the following description will be defined. First the horizontal direction from the DMD 13 to the concave mirror 25 is defined as the X axis. The vertical direction, perpendicular to the X axis, is defined as the Y axis. And an axis perpendicular to the X and Y axis is defined as the Z axis.

As FIG. 3 to FIG. 6 show, the mirror holding mechanism 33 has a mirror holder 41 holding the concave mirror 25, and a mirror holder base 42 secured to the lower projection base 21 by screws. A pair of bosses 44, protruding in the X axis direction, on the mirror holder 41, are inserted into a pair of positioning holes 45 formed in the mirror holder base 42 (see FIG. 4). The mirror holder 41 is resiliently energized in the Z axis direction by one retainer spring 47A, and is resiliently energized in the Y axis direction by two retainer springs 47B and 47C. As a consequence, for the mirror holder 41, parallel displacement is possible in the X axis direction, but parallel displacement is not possible in the Y axis direction and Z axis direction.

Figure 5:
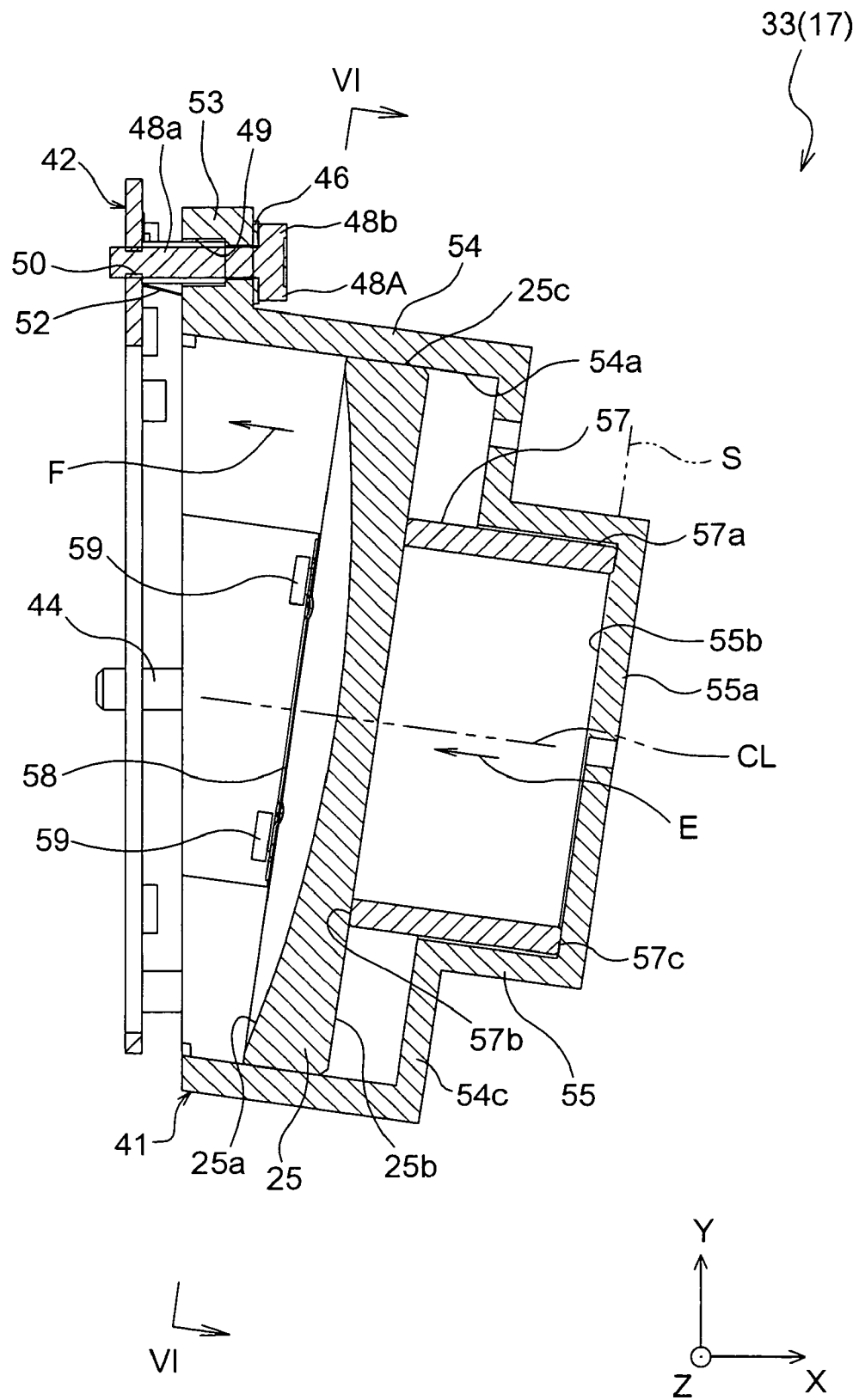
FIG. 5 is a cross-sectional view taken along a line V-V in FIG. 3.

The mirror holder 41 is connected to the minor holder base 42 via three male screws 48A, 48B and 48C, which extend in the X axis direction. As FIG. 5 shows, thread 48a of each male screw 48A to 48C is inserted into a through hole 49, which is formed in the mirror holder 41 in the X axis direction, and is screwed into a female screw hole 50, which is formed in the mirror holder base 42 in the X axis direction. A screw head 48b of the male screws 48A to 48C positions at the back face side of the mirror holder 41. A disk spring 52 is externally fit into the thread 48a of each male screw 48A to 48C in an area between the mirror holder 41 and the mirror holder base 42. This spring 52 resiliently urges the mirror holder 41 in a direction distant from the mirror holder base 42 so as to press the screw head 48b of the male screws 48A to 48C, and by this, the mirror holder 41 is secured to the mirror holder base 42, and a washer 46 is set between the screw head 48b and the mirror holder 41.

Figure 3:
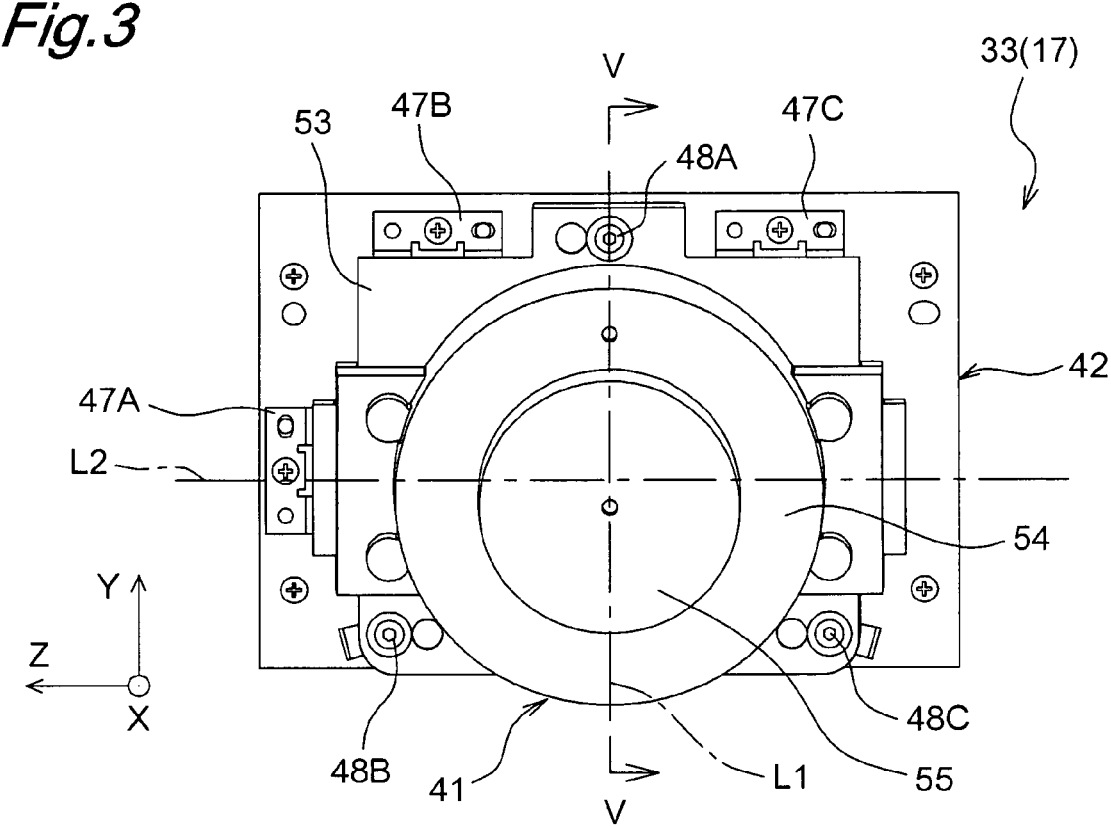
FIG. 3 is a rear view depicting a mirror holding mechanism of a concave mirror according to the first embodiment of the present invention.
Figure 4:
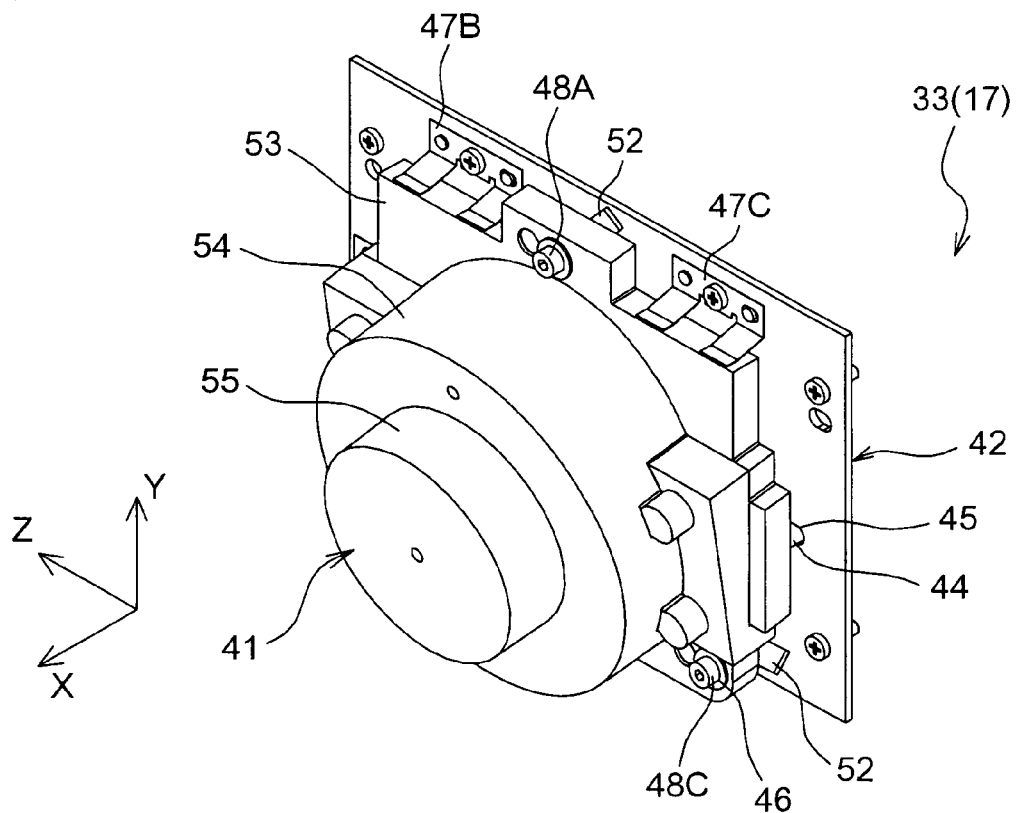
FIG. 4 is a rear side perspective view depicting the mirror holding mechanism of the concave mirror according to the first embodiment of the present invention.

The male screw 48A is disposed at the top of the mirror holder 41, and the other two male screws 48B and 48C are disposed at the bottom of the mirror holder 41. As FIG. 3 shows, the male screws 48B and 48C are disposed at positions which are symmetric with each other with respect to the symmetry axis L1, which passes through the center of the concave mirror 25 and is parallel with the Y axis. The male screws 48B and 48C are also disposed at positions which are symmetric with the male screw 48A with respect to the symmetry axis L2, which passes through the center of the concave mirror 25, and is parallel with the Z axis. Therefore if the male screws 48A to 48C are rotated in a tightening direction, the mirror holder 41 moves in a direction approaching the mirror holder base 42 for an amount according to the rotation amount, and is positioned at this position. If the male screws 48A to 48C are rotated in a loosening direction, the mirror holder 41 moves in a direction away from the mirror holder base 42 for an amount according to the rotation amount, and is positioned at this position. If the three male screws 48A to 48C are rotated in a same direction for a same amount, the mirror holder base 42 (concave mirror 25) moves in a straight line in the X axis direction with maintaining the inclination with respect to the X axis, Y axis and Z axis. By rotating the male screws 48B and 48C for a same amount in opposite directions, the mirror holder base 42 (concave mirror 25) can be rotated around the Y axis (symmetry axis L1). Also by rotating the male screw 48A and the male screws 48B and 48C for a same amount in opposite directions, the mirror holder base 42 (concave mirror 25) can be rotated around the Z axis (symmetry axis L2).

The mirror holder 41 has a plate type base portion 53 in which the above mentioned through hole 49 is formed, a cylindrical guide tube portion 54 which protrudes from the base portion 53 to the back face side, and a cylindrical holding tube portion 55 which protrudes from the guide tube portion 54 to the back face side. Inside this mirror holder 41, the concave mirror 25 and a focus correction member (thermal deformation member) 57 are housed.

Figure 6:
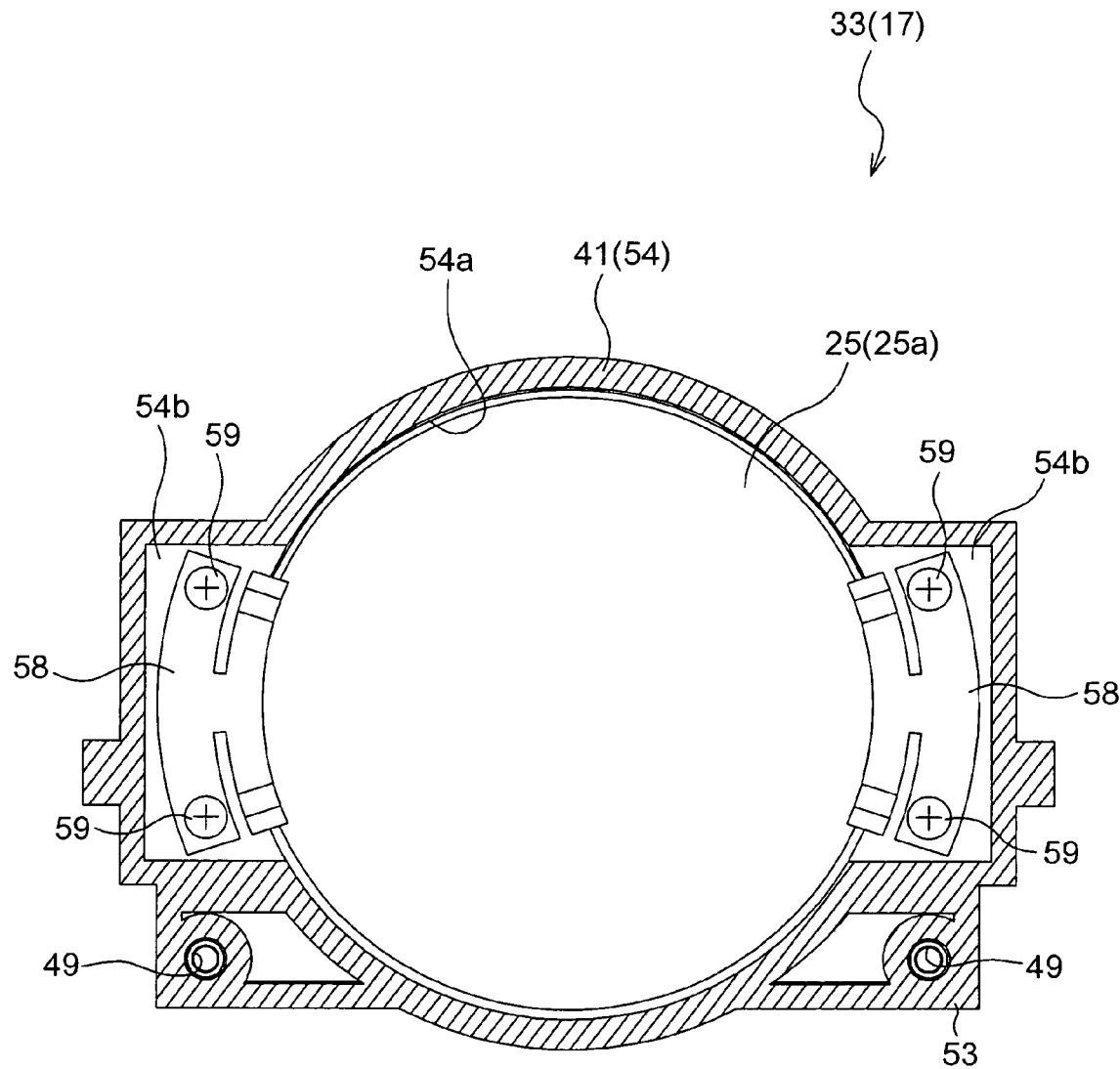
FIG. 6 is a cross-sectional view taken along a line VI-VI in FIG. 5.

The concave mirror 25 is disposed inside the guide tube portion 54. An outer face 25c of the concave mirror 25 contacts the inner face 54a of the cylindrical guide tube portion 54, and the concave mirror 25 is slidably held by the inner face 54a of the guide tube portion 54. Also as FIG. 6 shows, a pair of seat portions 54b, which face each other in the Z axis direction, are formed inside the guide tube portion 54. A pair of mirror retainer springs (urging member in the present embodiment) 58 are secured on the seat portions 54b by the screws 59 at the base side. The tip of an individual mirror retainer spring 58 contacts closely to the edge of the reflection face 25a of the concave mirror 35.

The holding tube portion 55 protrudes from a closed end portion 54c at the back end of the guide tube portion 54, and inside the holding tube portion 55 and inside the guide tube portion 54 are inter-connected. In the present embodiment, the diameter of the holding tube portion 55 is smaller than that of the guide tube portion 54. The inner face 55b (reference plane S in the present embodiment) of the closed end portion 55a of the holding tube portion 55 faces with the back face 25b of the concave mirror 25. The reference plane S extends in a direction perpendicular to the center axis (center of mirror form) CL of the concave mirror 25.

The focus correction member 57 in the present embodiment is a single cylindrical member, and is made of high thermal expansion resin material, as mentioned later. The back end side of the focus correction member 57 is held in the holding tube portion 55, and the cylindrical inner face of the holding tube portion 55 and the outer face 57a of the focus correction member 57 slidably contact each other. The front end side of the focus correction member 57 protrudes from the closed end portion 55a to the guide tube portion 54. The front end face 57b of the focus correction member 57 contacts the back face 25b of the concave mirror 25. The back end face 57b of the focus correction member 57, on the other hand, contacts the inner face 55b of the closed end portion 55a of the holding tube portion 55.

The above mentioned mirror retainer spring 58 urges the concave mirror 25 and the focus correction member 57 to the back face 25b side of the concave mirror 25, toward the inner face 55c of the closed end portion 55b of the holding tube portion 55. By this urging force of the mirror retainer spring 58, the concave mirror 25 is urged to the inner face 55b of the closed end portion 55a via the focus correction member 57, and by this, the concave mirror 25 is positioned in the guide tube portion 54 of the mirror holder 41.

If the projection bases 21 and 22 are thermally expanded by the rise of the ambient environment temperature, or by the rise of internal temperature of the casing 12, the positional relationship of the DMD 13 and the concave mirror 25 and the positional relationship among the curved mirrors 25, 28, 30 and 31 change. For example, by the thermal expansion of the lower projection base 21, the distance between the DMD 13 and the concave mirror 25 increases. These changes of the positional relationships become a cause of out of focus. In the present embodiment, however, if temperature rises, the focus correction member 57 expands thermally, and displaces the concave mirror 25, and by this, the out of focus is corrected. Specifically, if temperature rises, the length of the cylindrical focus correction member 57 in the axis direction increases by thermal expansion. As mentioned above, the back end face 57c of the focus correction member 57 contacts the back end of the mirror holder 41, that is the inner face 55b of the closed end portion 55a of the holding tube portion 55, so if the focus correction member 57 extends by thermal expansion, the front end face 57b of the focus correction member 57 displaces to the reflection face 25a side of the concave mirror 25, as shown by arrow E in FIG. 5. As a result, the front end face 57b of the focus correction member 57 displaces the concave mirror 25 to the reflection face 25a side (direction away from the inner face 55b of the closed end portion 55a), as shown by arrow F, against the resilient urging force of the mirror retainer spring 58. The mirror holder 41 is positioned with respect to the lower projection base 21 via the mirror holder base 42, so the inner face 55b of the closed end portion 55a is also positioned with respect to the lower projection base 21. In other words, the inner face 55b of the closed end portion 55a specifies the reference plane S which is positioned with respect to the lower projection base 21. By the thermal expansion of the focus correction member 57 at a temperature rise, the concave mirror 25 displaces in a direction away from the reference plane S, approaching the DMD 13. By this displacement of the concave mirror 25, the increase of the distance between the DMD 13 and the concave mirror 25 and other influences caused by the thermal expansion of the lower projection base 21 is offset, and out of focus is corrected. When the temperature returns to the original temperature, the length of the focus correction member 57 returns to the length before the temperature rise, and the position of the concave mirror 25 with respect to the reference plane S also returns to the position before the temperature rise by the resilient urging force of the mirror retainer spring 58.

The concave mirror 25 is displaced not by the thermal expansion of the mirror holder 41 for holding the concave mirror 25, but by the thermal expansion of the focus correction member 57, which is a different member from the mirror holder 41, and this corrects out of focus. Therefore a material having a linear expansion coefficient characteristic that can secure a necessary correction amount can be selected as a material of the focus correction member 57, without being restricted to securing strength. As a result, the expansion amount of the focus correction member 57 at a temperature rise by thermal expansion can be set to an optimum value, and out of focus can be effectively corrected. For a material used for the lower and upper projection bases 21 and 22 and the mirror holder 41, a resin material, such as polycarbonate, and metal material, such as SUS 430, can be used. In order to secure a sufficient correction amount at thermal expansion, it is preferable to use a material with a higher thermal expansion, such as a material having a linear expansion coefficient $8 \times 10^{-5}$ (1/K) or more and $15 \times 10^{-5}$ (1/K) or less for the focus correction member 57. Examples of these materials having a linear expansion coefficient in this range and also have other characteristics, such as strength, suitable for the focus correction member 57 are polyacetal resin (POM) and polybutylene telephthalate resin (PBT). The linear expansion coefficient of POM is $8.1 \times 10^{-5}$ (1/K) or more and $11 \times 10^{-5}$ (1/K) or less, and the linear expansion coefficient of PBT is $9 \times 10^{-5}$ (1/K) or more and $13 \times 10^{-5}$ (1/K) or less.

If the linear expansion coefficient of the lower projection base 21 is $3.0 \times 10^{-5}$ (1/K) and the installation space between the DMD 13 and the concave mirror 25 (X axis direction) is 70 mm, the focus correction member 57 can be a linear expansion coefficient of $12 \times 10^{-5}$ (1/K) and a length of 17.5 mm. In this case, the space between the DMD 13 and the concave mirror 25 stretches 84 μm by the thermal expansion of the lower projection base 21 when temperature rises 40° C., but this stretch of space is offset by the displacement of the concave mirror 25 generated by the thermal expansion of the focus correction member 57.

In the present embodiment, the reference plane S of the displacement of the concave mirror 25, caused by the thermal expansion of the focus correction member 57, is specified by the mirror holder 41 (inner face 55b of the closed end portion 55a of the holding tube portion 55). In other words, the number of composing elements does not increase to create the reference plane S. The focus correction member 57 is housed in the mirror holder 41, along with the concave mirror 25. Therefore the out of focus at a temperature change can be corrected by a minimum number of composing elements. The focus correction member 57 displaces the concave mirror 25 with respect to the reference plane S, which extends in a direction perpendicular to the center axis CL thereof, so displacement of the concave mirror 25 in a direction crossing the center axis CL at a temperature rise can be prevented. Also in this structure, the concave mirror 25 is held by the guide tube portion 54 of the mirror holder 41, so the curved mirror can be secured to the projection base in a stable status where the curved mirror 25 is not shaken very much by vibration, and displacement other than displacement causing out of focus hardly occurs.

In the present embodiment, out of focus is corrected by displacing the concave mirror 25 facing the DMD 13, out of the four curved mirrors 25, 28, 30 and 31 of the projection unit 17 by the thermal expansion of the focus correction member 57. By using the curved mirror disposed closest to the DMD 13 as the correction target like this, out of focus can be corrected while minimizing the influence on other optical performances.

In the present embodiment, the concave mirror 25 to be the out of focus correction target and the DMD 13 are installed on a single lower projection base 21. Compared with the case of the concave mirror 25 and the DMD 13 being installed on different members, displacement due to thermal expansion can be estimated at higher accuracy by installing both the concave mirror 25 and the DMD 13 on a same lower projection base 21. As a result, the displacement amount of the concave mirror 25, due to thermal expansion of the focus correction member required for correcting out of focus, can be set to an appropriate value.

Second Embodiment

Figure 7:
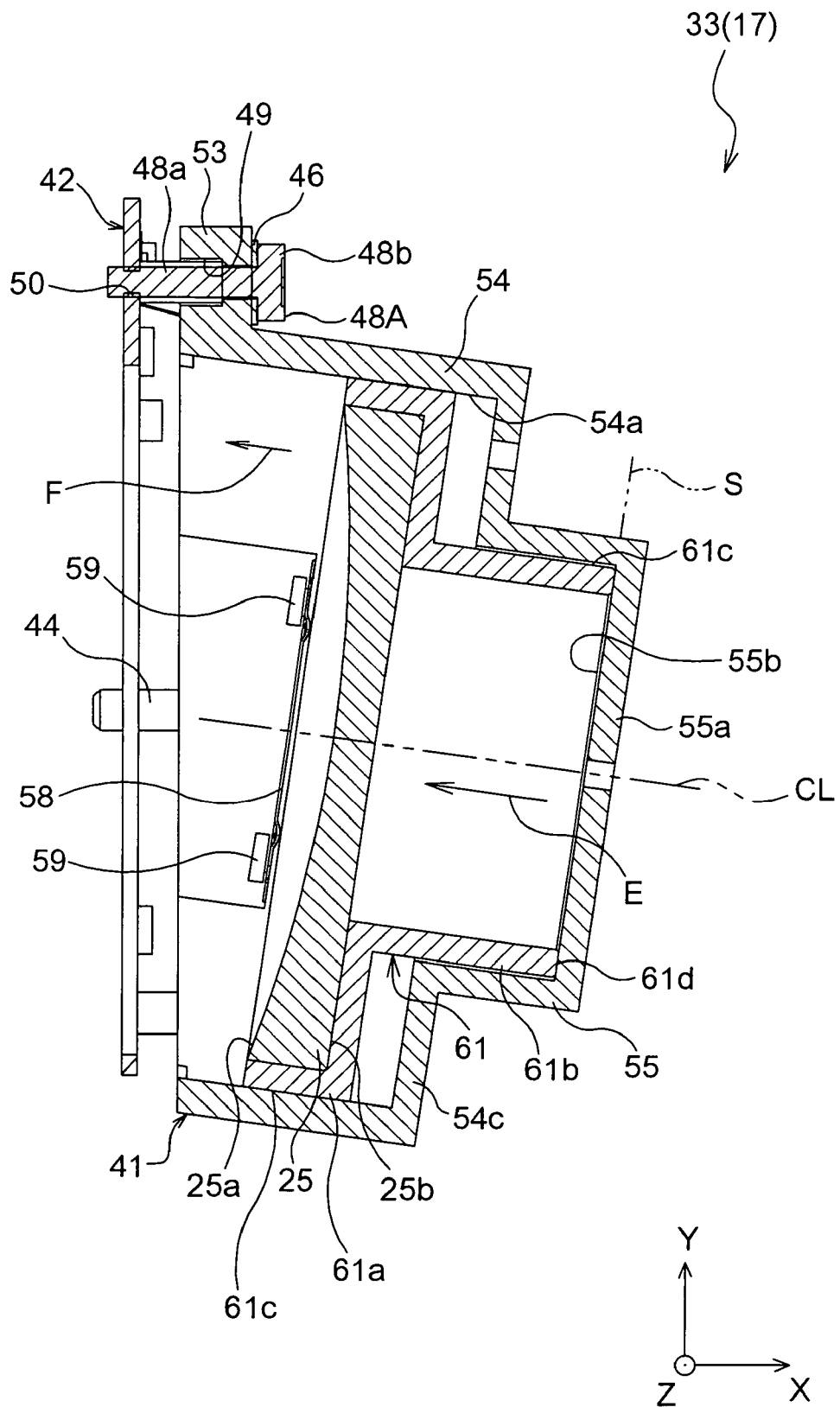
FIG. 7 is a longitudinal sectional view depicting a mirror holding mechanism of the concave mirror according to a second embodiment of the present invention.

FIG. 7 shows a mirror holding mechanism 33 of a concave mirror 25 according to the second embodiment. A focus correction member 61 has a flat cylindrical mirror hosing portion 61a, and the concave mirror 25 is housed in this mirror hosing portion 61a. A cylindrical main portion 61b of which diameter is smaller than that of the mirror hosing portion 61a extends from the mirror hosing portion 61a to the back face side of the concave mirror 25. An outer face 61c of the mirror hosing portion 61a of the focus correction member 61 contacts to a cylindrical inner face 54a of a guide tube portion 54 of a mirror holder 41, and the mirror hosing portion 61a of the focus correction member 61 is slidably held by the inner face 54a of the guide tube portion 54. The back end side of the main portion 61b of the focus correction member 61 is held inside the holding tube portion 55 of a mirror holder 41, and the cylindrical inner face of the holding tube portion 55 and the outer face 61c of the main portion 61b of the focus correction member 61 contact each other in slidable status. The back end face (end face opposite side of the mirror hosing portion 61a) 61d of the main portion 61b of the focus correction member contacts the inner face 55b (reference plane S) of a closed end portion 55a of the holding tube portion 55. A mirror retainer spring 58 urges the concave mirror 25 and the focus correction member 61 to the back face 25b side of the concave mirror 25, so as to press them against the reference plane S.

The guide tube portion 54 of the mirror holder 41 slidably guides the mirror hosing portion 61a of the focus correction member 61 housing the concave mirror 25. Therefore compared with the structure of the guide tube portion 54 of the mirror holder 41 directly guiding the concave mirror 25 itself, like the case of the first embodiment, shakiness is less, and the reproducibility of the displacement amount of the concave mirror 25, when a temperature rise is repeated, is better. Also the concave mirror 25 is housed in the thermal deformation member 61 itself (mirror hosing portion 61a), without urging the movable concave mirror 25 by the focus correction member during a temperature rise, like the case of the first embodiment, so the reproducibility of the displacement amount of the concave mirror 25, when a temperature rise is repeated, is good. Also the concave mirror 25 is held in the guide tube portion 54 of the mirror holder 41 via the mirror hosing portion 61a of the focus correction member 61, so the concave mirror 25 can be secured to the lower projection base 21 in a stable status where the concave mirror 25 is not shaken very much by vibration, and displacement other than displacement causing out of focus hardly occurs.

The other configurations and functions of the second embodiment are the same as the first embodiment, so the same composing elements are denoted with the same reference symbols and description thereof is omitted.

Third Embodiment

Figure 8:
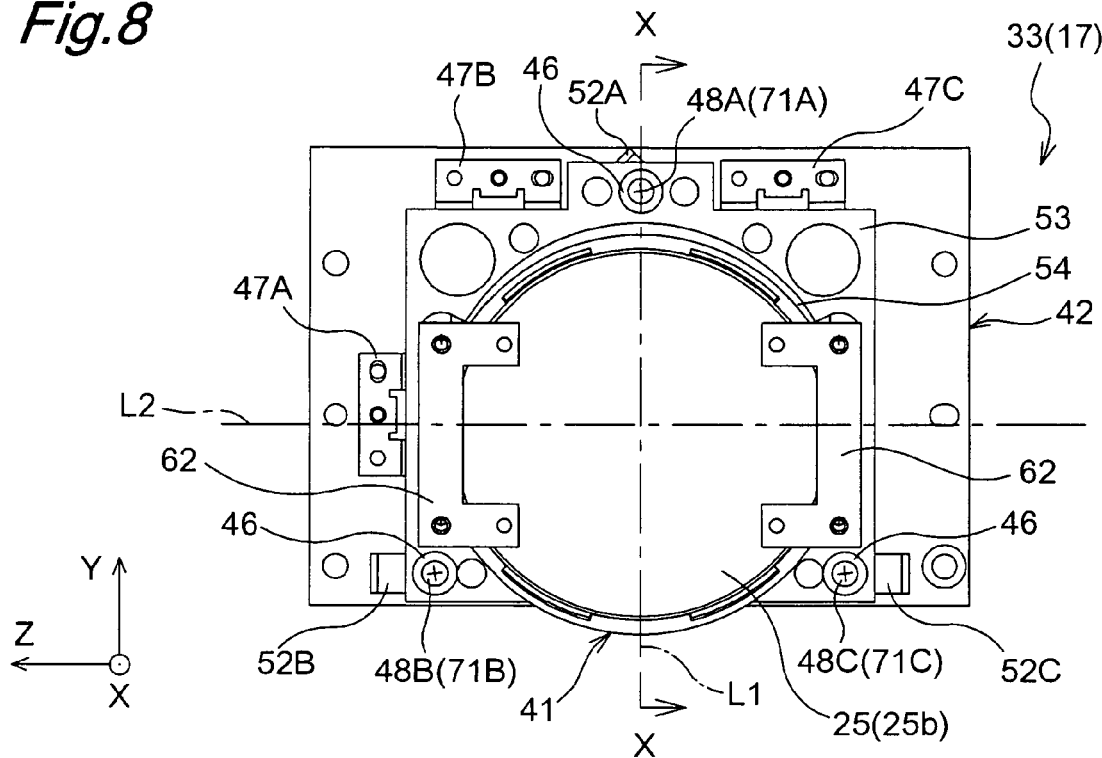
FIG. 8 is a rear view depicting a mirror holding mechanism of a concave mirror according to a third embodiment of the present invention.
Figure 9:
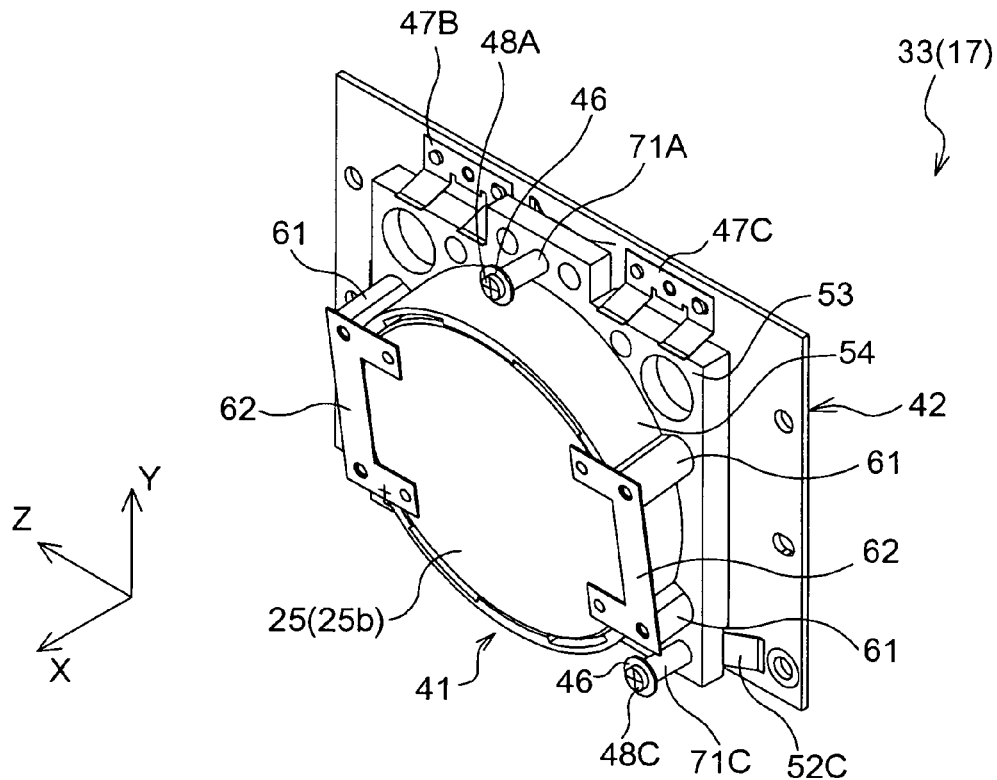
FIG. 9 is a rear side perspective view depicting the mirror holding mechanism of the concave mirror according to the third embodiment of the present invention.
Figure 10:
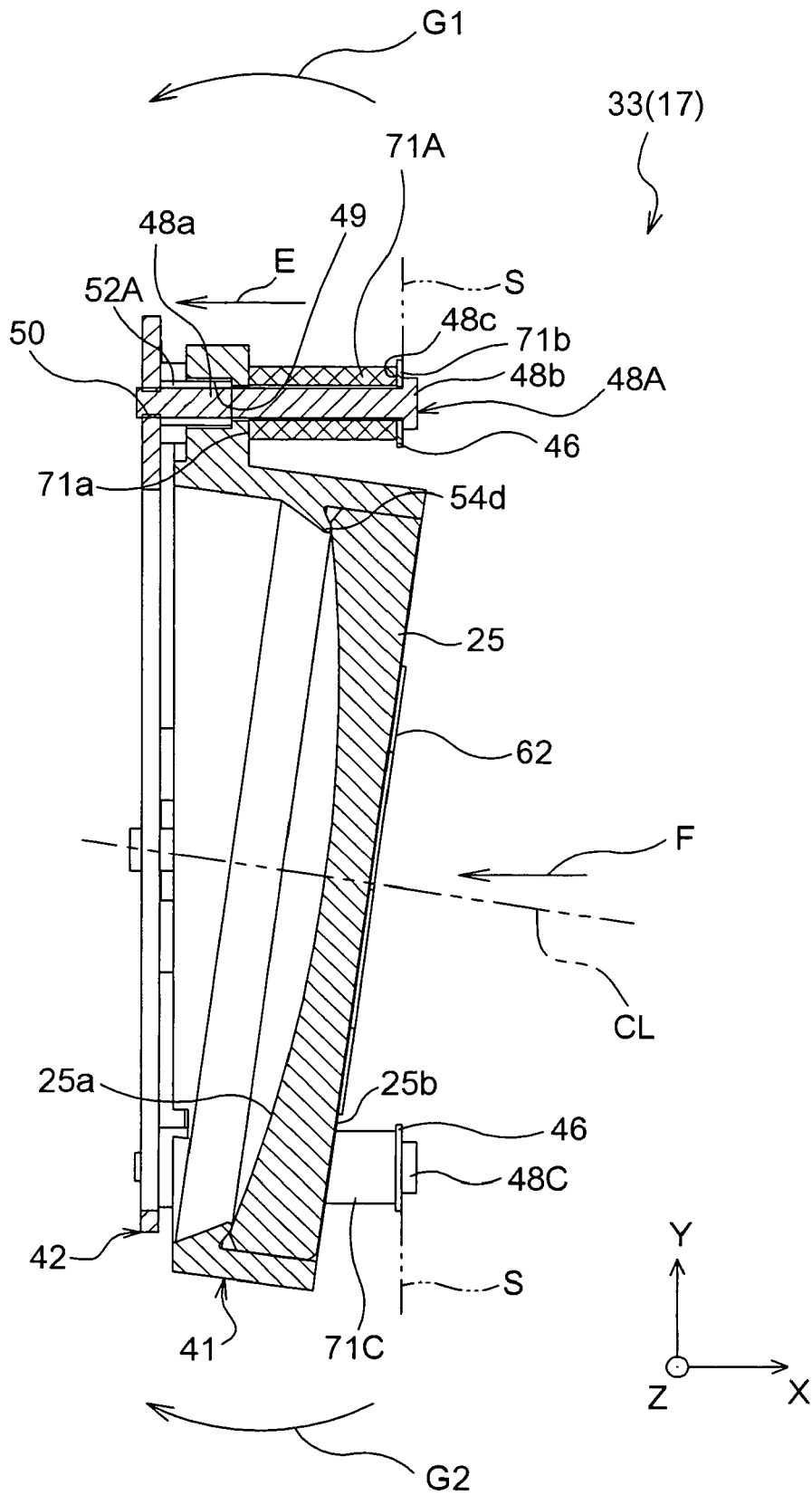
FIG. 10 is a cross-sectional view taken along a line X-X in FIG. 8.
Figure 11:
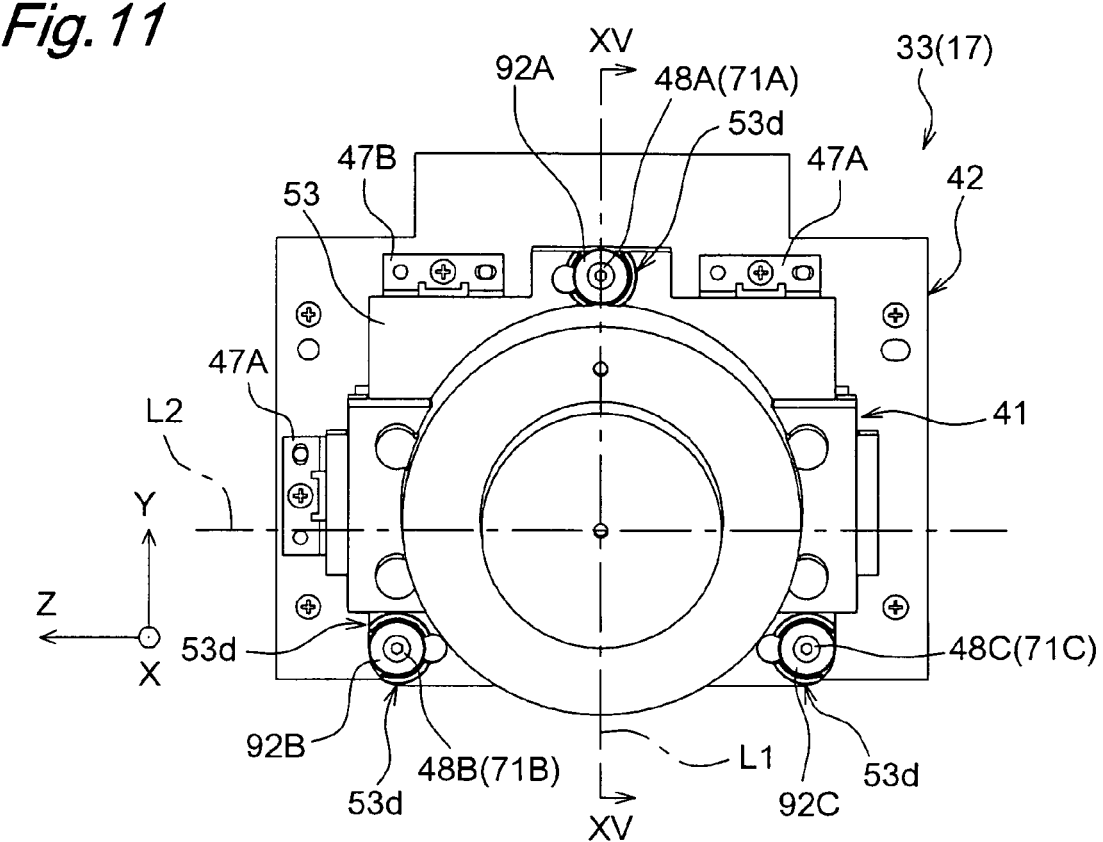
FIG. 11 is a rear view depicting a mirror holding mechanism of a concave mirror according to a fourth embodiment of the present invention.
Figure 12:
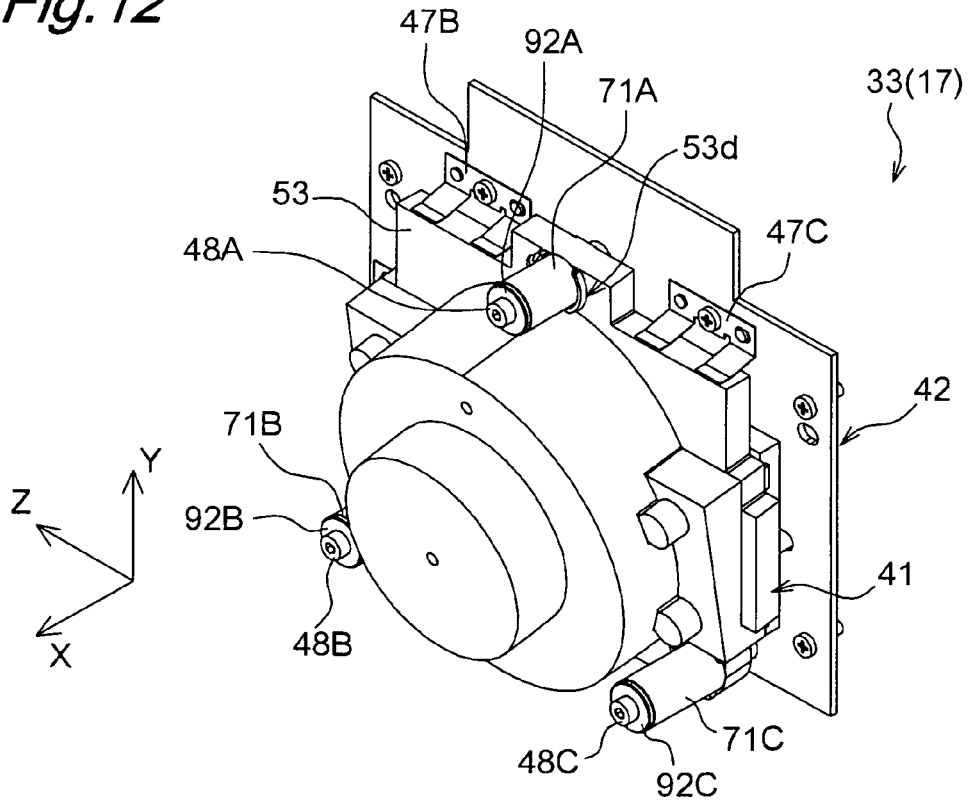
FIG. 12 is a rear side perspective view depicting a mirror holding mechanism of a concave mirror according to a fourth embodiment of the present invention.
Figure 13:
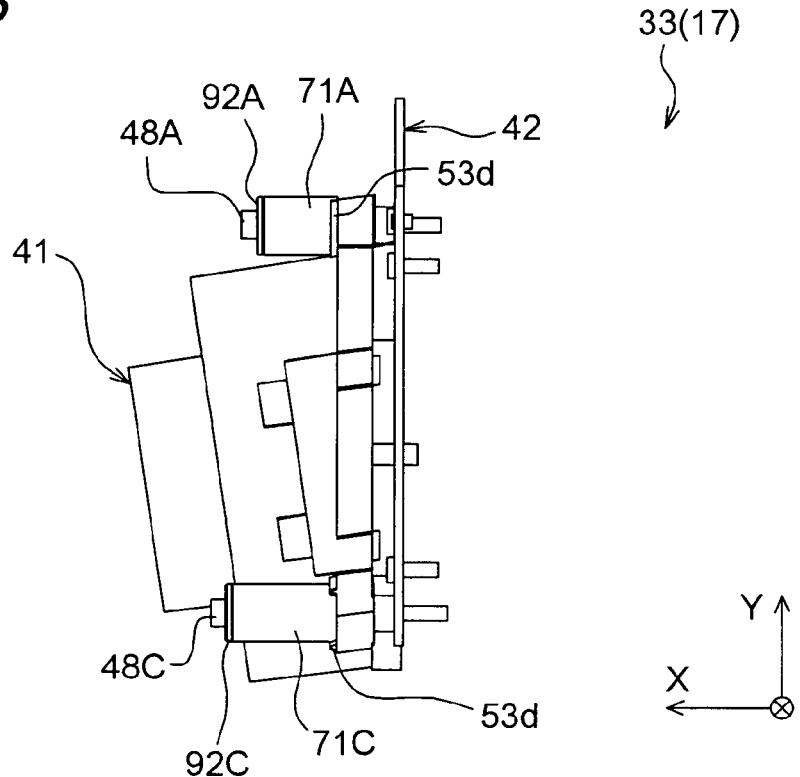
FIG. 13 is a left side view depicting the mirror holding mechanism of the concave mirror according to the fourth embodiment of the present invention.
Figure 14:
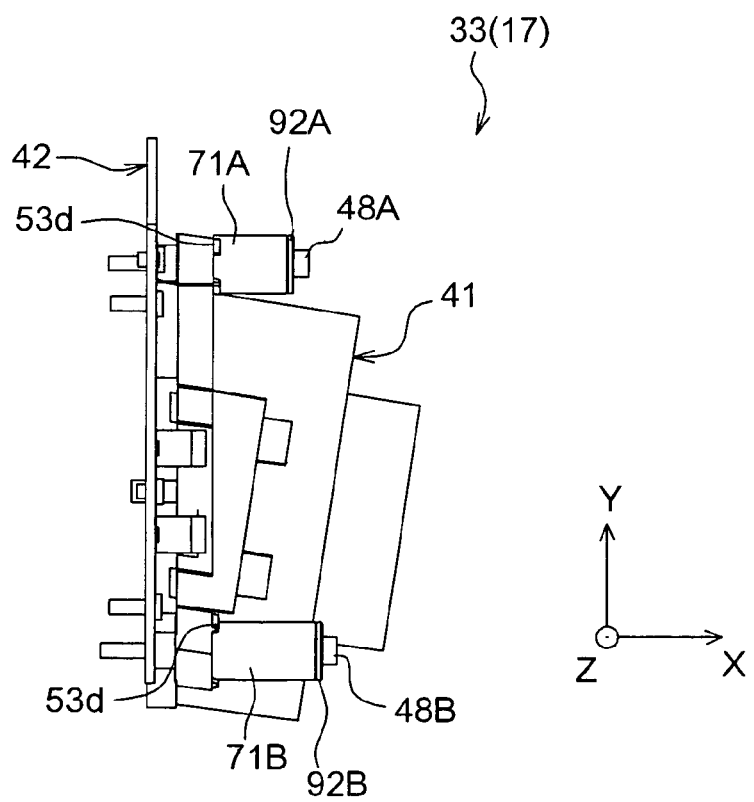
FIG. 14 is a right side view depicting the mirror holding mechanism of the concave mirror according to the fourth embodiment of the present invention.

FIG. 8 to FIG. 10 show a mirror holding mechanism 33 of a concave mirror 25 according to the third embodiment of the present invention. In the present embodiment, a concave mirror 25 is secured to a mirror holder 41. The mirror holder 41 has a base station 53 and a guide tube portion 54, but does not have the holding tube portion 55 (e.g. see FIG. 7). Two boss portions 61 are created respectively on both sides outside the guide tube portion 54. Bottom ends of a pair of mirror retainer springs 62 are secured to the boss portion 61 respectively by screws, and the tips of these mirror retainer springs 62 contact the back face 25b side of the concave mirror 25, and press the concave mirror 25 to the reflection face 25a side. A latching protrusion portion 54d is installed on an inner face of the guide tube portion 54, and the concave mirror 25 is secured to the mirror holder 41 by pushing the edge of the reflection face 25a of the concave mirror 25 to the latching protrusion portion 54d by the urging force of the mirror retainer spring 62.

The mirror holder 41 is connected to a mirror holder base 42 via three male screws (rod members) 48A to 48C, which extend in the X axis direction (back face 25b side of the concave mirror 25). Just like the first embodiment, the male screws 48B and 48C are disposed at position which are symmetric with each other with respect to a symmetry axis L1, which passes through the center of the concave mirror 25 and is parallel with the Y axis, the male screws 48B and 48C are disposed at position which are symmetric with the male screw 48A with respect to a symmetry axis L2, which passes through the center of the concave mirror 25 and is parallel with the Z axis (see FIG. 8). As FIG. 10 shows, the thread 48a (axis portion having a first diameter) of each male screw 48A to 48C is inserted in a through hole 49 in the X axis direction, which is formed in a base portion 53 of the mirror holder 41, and is screwed into a female screw hole 50 in the X axis direction formed in the mirror holder base 42. The screw head (enlarged portion having a second diameter greater than the first diameter) 48b of each male screw 48A to 48C is positioned on the back face side of the base portion 53 of the mirror holder 41 with spacing.

In the thread 48a of each male screw 48A to 48C, a disk spring 52A, 52B or 52C is inserted at a location between the mirror holder 41 (base portion 53) and the mirror holder base 42. Also in the thread 48a of each male screw 48A to 48C, a cylindrical focus correction member 71A, 71B or 71C is inserted between the mirror holder 41 (base portion 53) and the screw head 48b of each male screw 48A to 48C. These focus correction members 71A to 71C are made of a high thermal expansion resin having linear expansion coefficients of $8 \times 10^{-5}$ (1/K) or more and $15 \times 10^{-5}$ (1/K) or less, such as polyacetal resin (POM) and polybutylene telephthalate resin (PBT), just like the focus correction members 57 and 61 of the first and second embodiments.

The front end face 71a of each focus correction member 71A to 71C contacts the back face side of the base portion 53 of the mirror holder 41, and the back end face 71b thereof contacts the front end face 48c of the screw head 48b of each male screw 48A to 48C via a washer 46. In the present embodiment, the front end face 48c of the screw head 48b functions as a reference plane S. Each spring 52A to 52C resiliently energizes the mirror holder 41 in a direction away from the mirror holder base 42, and urges the mirror holder 41 and the focus correction member 71A to 71C to the reference plane S via the washer 46. As a result, the mirror holder 41 is secured to the mirror holder base 42.

When temperature rises, the length of each cylindrical focus correction member 71A to 71C increases due to thermal expansion, so the front end face 57b of the focus correction member 71A to 71C displaces to the reflection face 25a side of the concave mirror 25, as arrow E in FIG. 10 shows. As a result, the front end face 71a of the focus correction member 71A to 71C displaces the mirror holder 41 to the reflection face 25a side, as arrow F shows, against the resilient urging force of the mirror retainer spring 62.

In the present embodiment, the reference plane S is a plane connecting the end faces 48c of the screw heads 48b of the three screws 48A to 48C, and the mirror holder 41 displaces in a direction away from the reference plane S. As mentioned above, the concave mirror 25 is secured to the mirror holder 41, so the concave mirror 25 displaces as the mirror holder 41 also displaces. As a result, the influence of the thermal expansion of the lower projection base 21, such as the increase of the distance between the DMD 13 and the concave mirror 25, is offset, and out of focus is corrected. When the temperature drops back to the original temperature, the length of the focus correction member 71A to 71C returns to the length before the temperature increase, and the mirror holder 41 (concave mirror 25) also returns to a position before the temperature rise with respect to the reference plane S by the resilient urging force of the springs 52A to 52B.

The mirror holder 41, in which the concave mirror 25 is secured, is slidably supported by the thread portions 48b of the three male screws 48A to 48C. Therefore compared with the structure of slidably supporting the concave mirror 25 itself, like the first embodiment, shakiness is less and the reproducibility of the displacement amount of the concave mirror 25, when temperature rise is repeated, is good. Also when temperature rises, the concave mirror 25 displaces by the mirror holder 41 being pushed by each focus correction member 71A to 71C moving along the thread 48b. Since the structure of directly pushing the concave mirror 25 itself by the focus correction members 71A to 71C is not used, the reproducibility of the displacement amount of the concave mirror 25, when temperature rise is repeated, is good. In this structure, the mirror holder 41, securing the concave mirror 25, is supported by the three male screws 48A to 48C, so the concave mirror 25 can be secured to the lower projection base 21 in a stable status where the concave mirror 25 is not shaken very much by vibration, and displacement other than displacement causing out of focus hardly occurs. Also each focus correction members 71A to 71C displaces the concave mirror 25 with respect to the reference plane S, which extends in a direction crossing the center axis CL thereof, so the generation of displacement of the concave mirror 25 in a direction crossing the center axis CL at a temperature rise can be prevented.

By changing the engagement length of the thread 48a with the female screw hole 50 by rotating each male screw 48A to 48C, the male screw can move to or from the mirror holder base 42, by which the position of the screw head 48b, that is the position of the reference plane S, can be changed. If an individual position of the screw head of the reference plane S is changed, the inclination of the mirror holder 41 changes. Therefore the inclination of the concave mirror 25 can be adjusted by adjusting the male screws 48A to 48C. For example, by rotating the male screws 48B and 48C for a same amount in opposite directions, the concave mirror 25 can be rotated around the Y axis (symmetry axis L1). By rotating the male screw 48A and the male screws 48B and 48C for a same amount in opposite directions, the concave mirror 25 can be rotated around the Z axis (symmetry axis L2). Also by making the engagement length of the male screws 48A to 48C different, the reference plane S, which is a plane connecting the end faces 48c of the screen heads 48b, extends in a direction crossing the center axis CL of the concave mirror 25.

The expansion amount with respect to a temperature rise may be changed at least between two out of three focus correction members 71A to 71C. For example, by forming at least two out of the focus correction members 71A to 71C with materials with different linear expansion coefficients, the expansion amount, with respect to the temperature rise, can be different between these two focus correction members. In other words, as the linear expansion coefficient becomes greater, the expansion amount of the focus correction members 71A to 71C at a temperature rise. Even if the linear expansion coefficients are the same, the expansion amounts of at least two out of the focus correction members 71A to 71C can be made different by changing the lengths thereof. In other words, as the length of the focus correction members 71A to 71C becomes longer, the expansion amount at a temperature rise increases. By changing the expansion amount with respect to the temperature rise at least between two out of the three focus correction members 71A to 71C, the inclination or orientation of the mirror holder 41, in which the concave mirror 25 is secured, at a temperature rise, changes from the inclination or orientation before the temperature rise. Therefore by appropriately setting the deformation amount of the individual focus correction members 71A to 71C (thermal deformation members) with respect to the temperature rise, not only correction of out of focus but also astigmatism can be corrected.

If the astigmatism in the vertical direction becomes greater than the astigmatism in the horizontal direction at a temperature rise, the astigmatism can be corrected by setting the linear expansion coefficient and the length of the focus correction members 71A to 71C so that the concave mirror 25 inclines in a direction shown by arrow G1 at a temperature rise. If the astigmatism in the horizontal direction becomes greater than the astigmatism in the vertical direction at a temperature rise, the astigmatism can be corrected by setting the linear expansion coefficient and the length of the focus correction members 71A to 71C so that the concave mirror 25 inclines in a direction shown by the arrow G2 at a temperature rise.

Also by changing the expansion amount with respect to the temperature rise at least between two out of the three focus correction members 71A to 71C, not only the correction of out of focus but also the displacement of the image projected on the screen 19 can be corrected.

The temperature change of various components of the projection unit 17, such as the element holding optical components (e.g. mirror holder 41), lower projection base 21, upper projection base 22 and casing 12, shifts the position of the image projected on the screen 19. For example, when the temperature rises by 35° C., the position of the projected image on a 60 inch screen 12 may generate a 4 to 5 mm shift in some cases.

If the position of the image projected on the screen 19 shifts 4.57 mm in the Z axis direction (lateral direction), this displacement corresponds to a 0.1 degree inclination around the Y axis of the concave mirror 25. If the focus correction members 71A to 71C are made of POM (linear expansion coefficient $11 \times 10^{-5}$/K), and this displacement in the Z axis direction must be corrected, a 4.5 mm difference is created between the lengths of the two focus correction members 71B and 71C, which are disposed inline in the Z axis direction, before a temperature rise, so that the expansion amount at a temperature rise become different.

If the position of the image projected on the screen 19 shifts 4.71 mm in the Y axis direction (longitudinal direction), this displacement corresponds to the 0.1 degree inclination around the Z axis of the concave mirror 25. If the focus correction members 71A to 71C are made of POM (linear expansion coefficient $11 \times 10^{-5}$/K), and this displacement in the Y axis direction must be corrected, a 4 mm difference is created between the focus correction member 71A and the focus correction members 71B and 71C, which are disposed inline in the Y axis direction, before a temperature rise, so that the expansion amount at a temperature rise becomes different, and the lengths of the focus correction members 71B and 71C are set to be the same.

If the position of the image projected on the screen 19 shifts in both the Z axis direction (lateral direction) and the Y axis direction (longitudinal direction), and the linear expansion coefficients of the materials constituting the focus correction members 71A to 71C are the same, the lateral lengths of the two focus correction members 71B and 71C, which are disposed inline in the Z axis direction before a temperature rise, are set to be different by the length according to the displacement of the image, and the longitudinal lengths of the focus correction member 71A and the focus correction members 71B and 71C are set to be different by the length according to the displacement of the image. It is also possible that the lengths of the focus correction members 71A to 71C before a temperature rise are set to be the same, and materials having a different linear expansion coefficient are used for the focus correction members 71A to 71C so that the expansion amounts with respect to the temperature rise become different, and displacement of the image on the screen 19 is corrected by this.

Other configurations and functions of the third embodiment are the same as the first embodiment, so the same composing members are denoted with the same reference symbols, and description thereof is omitted.

Fourth Embodiment

FIG. 11 to FIG. 16 show a mirror holding mechanism 33 of a concave mirror 25 according to the fourth embodiment of the present invention.

Figure 15:
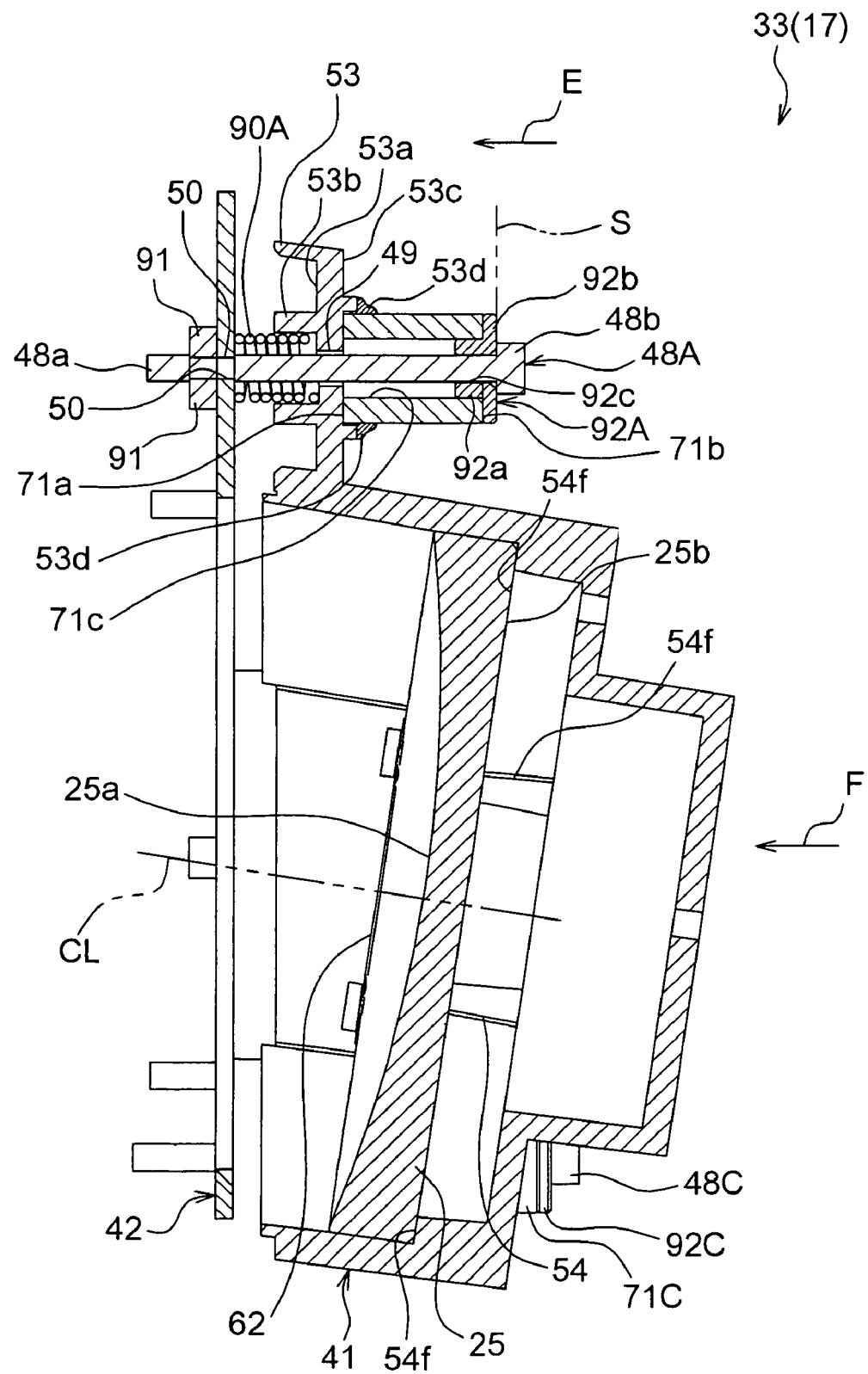
FIG. 15 is a cross-sectional view taken along a line XV-XV FIG. 11.

As FIG. 15 shows, on an inner face of a mirror holder 41, a plurality of receive portions 54f are formed. The concave mirror 25 is resiliently urged by a mirror retainer spring 62 on the side of the reflection face 25a. By urging a back face 25b to the receive portion 54f by the urging force of the mirror retainer spring 62, the concave mirror 25 is secured to the mirror holder 41.

Figure 16:
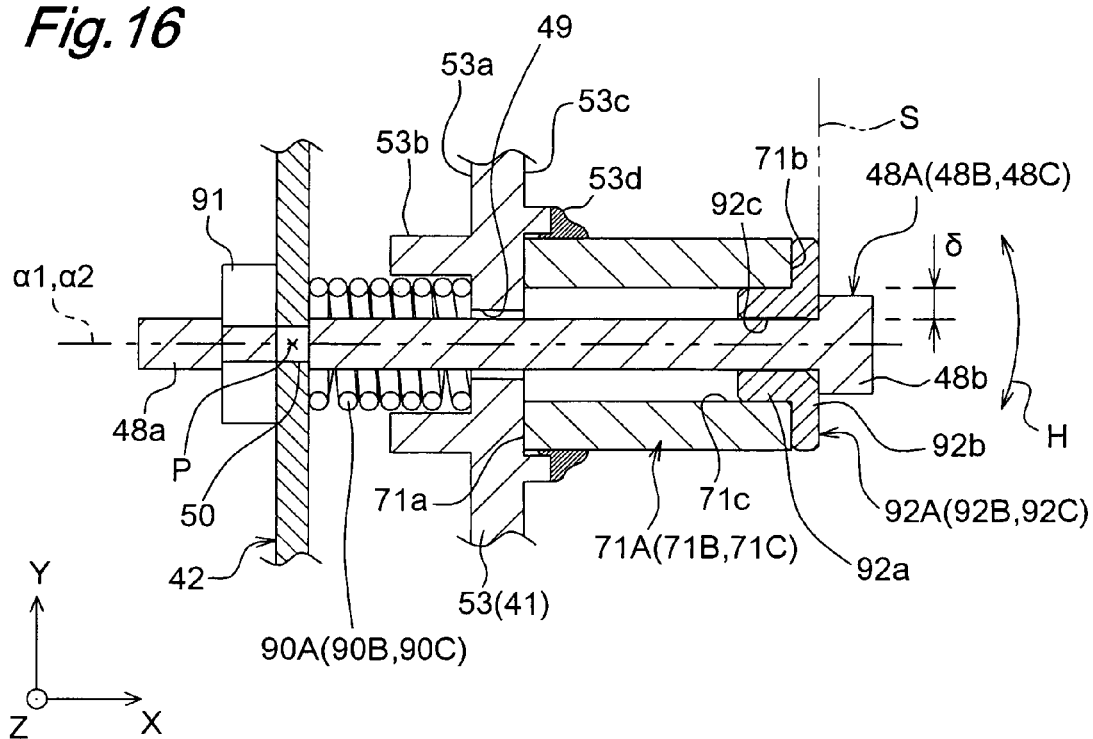
FIG. 16 is a partially enlarged view of FIG. 15.

As FIG. 15 and FIG. 16 show, each coil spring 90A to 90C externally fits in an area between the mirror holder 41 and a mirror holder base 42 of a thread 48a of each male screw 49A to 48C. Each coil spring 90A to 90C resiliently urges the screw head 48b of each male screw 48A to 48C in a direction away from the mirror holder base 42, and by this, the mirror holder 41 is secured to the mirror holder base 42. In the front face 53a side of the mirror holder base 53, a cylindrical protrusion 53b for holding the coil springs 90A to 90C is formed.

Each thread 48a of the male screws 48A to 48C is inserted in a through hole 49 in the X axis direction formed in the mirror holder 41, and is screwed into a female screw hole 50 in the X axis direction formed in the mirror holder base 42. A nut 91 is attached at the tip of the thread 48.

Just like the third embodiment, the thread 48a of each male screw 48A to 48C is inserted through the through hole 71c of a cylindrical focus correction member 71A, 71B or 71C, and the front end faces 71a of these focus correction members 71A to 71C contact the back face 53c side of a base portion 53 of the mirror holder 41. The outer diameter of each focus correction member 71A to 71C is set to be sufficiently greater than the outer diameter of the thread 48a of the male screws 48A to 48C, and the gap δ (see FIG. 16) is formed there between. By creating this gap δ, friction of each focus correction member 71A to 71C with the thread 48a of the male screws 48A to 48C is decreased when the focus correction members 71A to 71C expands or shrinks thermally. As a result, the reproducibility of the thermal expansion of the focus correction members 71A to 71C is high, and the reproducibility of the displacement amount of the curved mirror is good.

In the tip side of each focus correction member 71A to 71C, that is in a connection portion of the thread 48a and the screw head 48b of each male screw 48A to 48C, a displacement restriction member (first displacement restriction portion) 92A to 92C is installed. Each displacement restriction member 92A to 92C has a small diameter portion 92a which is inserted in a portion at the back end face 71b side of the focus correction member 71A to 71C out of a through hole 71c of each focus correction members 71A to 71C, and a large diameter portion 92b, which is sandwiched between the back end face 71b of each focus correction member 71A to 71C and the screw head 48b of each male screw 48A to 48C. In each displacement restriction member 92A to 92C, a through hole 92c for letting the small diameter portion 92a and the large diameter portion 92b penetrate is formed, and the thread 48a of each male screw 48A to 48C is inserted through the through hole 92c.

The inner face of each displacement restriction member 92A to 92C, that is a hole wall of the through hole 92c, closely and externally fits the connection portion of the thread 48a of each male screw 48A to 48B and the screw head 48b. The outer face of the small diameter portion 92a of each displacement restriction member 92A to 92C closely and internally fits the hole wall of the through hole 71c of each focus correction member 71A to 71C. Each displacement restriction member 92A to 92C is secured to each focus correction member 71A to 71C by the outer face of the small diameter portion 92a closely and internally fitting the hole wall of the through hole 71c, and the large diameter portion 92b, being inserted between the screen head 48b of each male screw 48A to 48C and the back end face 71b of each focus correction member 71A to 71C. Therefore displacement of the connection portion of the thread 48a of each male screw 48A to 48C and the screw head 48b is restricted in a direction perpendicular to the axis line α1 of the thread 48a.

A displacement restriction protrusion (second displacement restriction portion) 53d for restricting the displacement of each focus correction member 71A to 71C in a direction perpendicular to the axis line α2 thereof is formed on the back face 53c of the base portion 53 of the mirror holder 42. The displacement restriction protrusion 53d, according to the present embodiment, has a shape divided cylinder, of which a cross portion perpendicular to the axis line α1 is an arc. The inside face of the displacement restriction protrusion 53d closely contacts the front end face 71a of each cylindrical focus correction member 71A to 71C. However the shape of the displacement restriction protrusion 53d is not particularly limited as long as the displacement of the focus correction members 71A to 71C in a direction perpendicular to the axis line α2 can be restricted, and may be a complete cylinder or a quadrangular prism or a combination of various forms of a cylinder and flat plate.

If only the gap δ is created between each focus correction member 71A to 71C and the thread 48a of each male screw 48A to 48C, and each displacement restriction member 92A to 92C is not created, each male screw 48A to 48C is inclined by a shock during transportation. Specifically, the inclination of each male screw 48A to 48C is generated with the portion P secured to the mirror holder base 42 as a fulcrum, as shown by arrow H in FIG. 16. If each male screw 48A to 48C is included with respect to the mirror holder base 42 like this, displacement (shakiness) is generated in a direction perpendicular to the axis line α1 in a connection portion of thread 48a and the screw head 48b of each male screw 48A to 48C. Even if the inclination of each male screw 48A to 48C is around a half degree, the displacement of the connection portion with the screw head 48b becomes several mm depending on the length of the thread 48a. By this displacement, the position of the mirror holder 41 with respect to the mirror holder base 42 shifts, so the position of the curved mirror 25 shifts. As a result, reproducibility of the displacement amount of the concave mirror 25, when a temperature rise is repeated, drops.

However in the present embodiment, the displacement of the connection portion of the thread 48a of each male screw 48A to 48C and the screw head 48b in a direction perpendicular to the axis line α1 is restricted by the back end portion 71b side of each focus correction member 71A to 71C because of the displacement restriction members 92A to 92C, so the inclination of each male screw 48A to 48C with the secured portion P as a fulcrum can be prevented. As a result, the displacement of the concave mirror 25 due to shakiness caused by this inclination can be prevented with certainty, and correction of out of focus with a higher reproducibility and accuracy becomes possible.

Displacement of the area near the front end face 71a of each focus correction member 71A to 71B, which restricts the displacement of the connection portion of the thread 48a and the screw head portion 48b of each male screw 48A to 48C, in a direction perpendicular to the axis line α2, is restricted by the displacement restriction protrusion 53d. Even if a force to incline each male screw 48A to 48C, with the secured portion P as a fulcrum, is applied to each focus correction member 71A to 71C via each displacement restriction member 92A to 92C, displacement in a direction perpendicular to the axis line α2 is not generated in each focus correction member 71A to 71C because of the presence of the displacement restriction protrusion 53d. In other words, each focus correction member 71A to 71C, for restricting the displacement of each male screw 48A to 48C in a direction perpendicular to the axis line α1 via each displacement restriction member 92A to 92C, is firmly positioned with respect to the mirror holder base 42 because of the displacement restriction protrusions 92A to 92C. As a result, shakiness caused by the inclination of each male screw 48A to 48C with the secured portion P as a fulcrum can be prevented with more certainty.

Even when only the displacement restriction member 92A to 92C is formed and the displacement restriction protrusion 53d is not formed, inclination of each male screw 48A to 48C with the secured portion P as a fulcrum can be prevented. If only the displacement restriction protrusion 53d is formed without forming each displacement restriction member 92A to 92C, on the other hand, a drop in the reproducibility of the displacement amount of the concave mirror 25, when a temperature rise is repeated, and a displacement of the concave mirror 25, caused by displacement in a direction perpendicular to the axis line α2, can be prevented.

Figure 17:
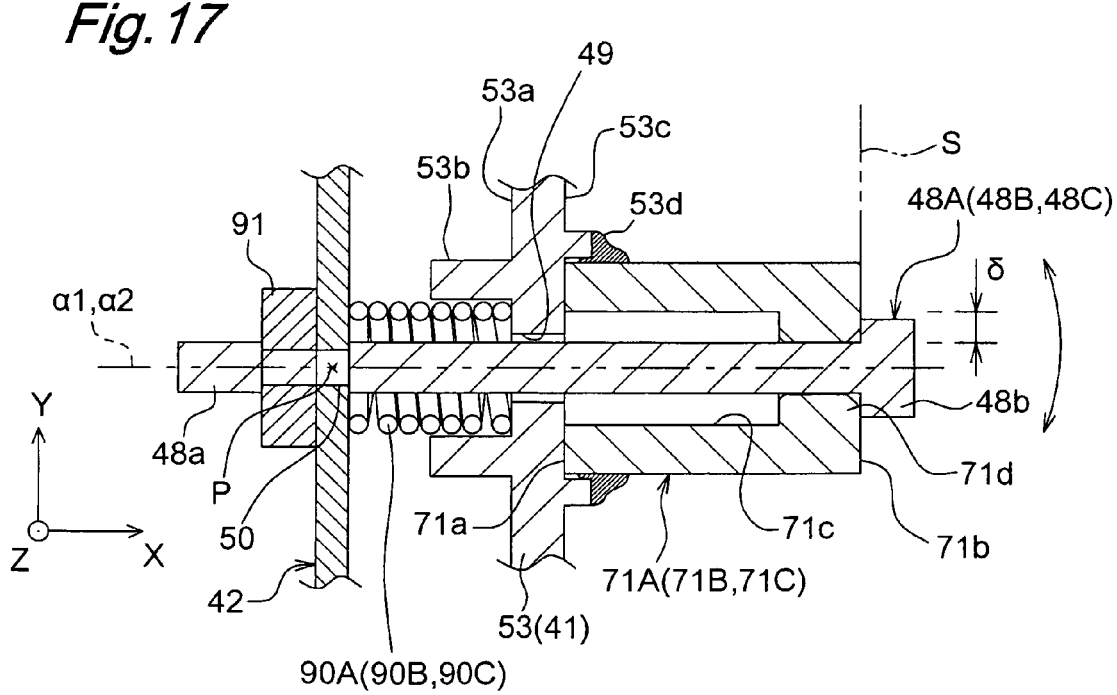
FIG. 17 is a partially enlarged cross-sectional view depicting an alternative of the fourth embodiment.

FIG. 17 shows an alternative of the fourth embodiment. In this alternative, each displacement restriction member 92A to 92C is integrated with each focus correction member 71A to 71C. Specifically, the displacement restriction portion 71d is formed by letting the hole wall of the through hole 71c protrude inward in a ring shape in an area near the front end face 71a of each focus correction member 71A to 71C. The diameter of the through hole 71c in this area of the displacement restriction portion 71d is set so that the hole wall of the through hole 71c closely and externally fits the connection portion of the thread 48a and the screw head 48b of each male screw 48A to 48C. By disposing the displacement restriction portion 71d integrated with each focus correction member 71A to 71C, the shakiness caused by the inclination of each male screw 48A to 48C can be prevented without increasing the number of composing elements.

Other configurations and functions of the fourth embodiment are the same as the third embodiment, so the same composing elements are denoted with the same reference symbols, and description thereof is omitted.

Fifth Embodiment

Figure 18:
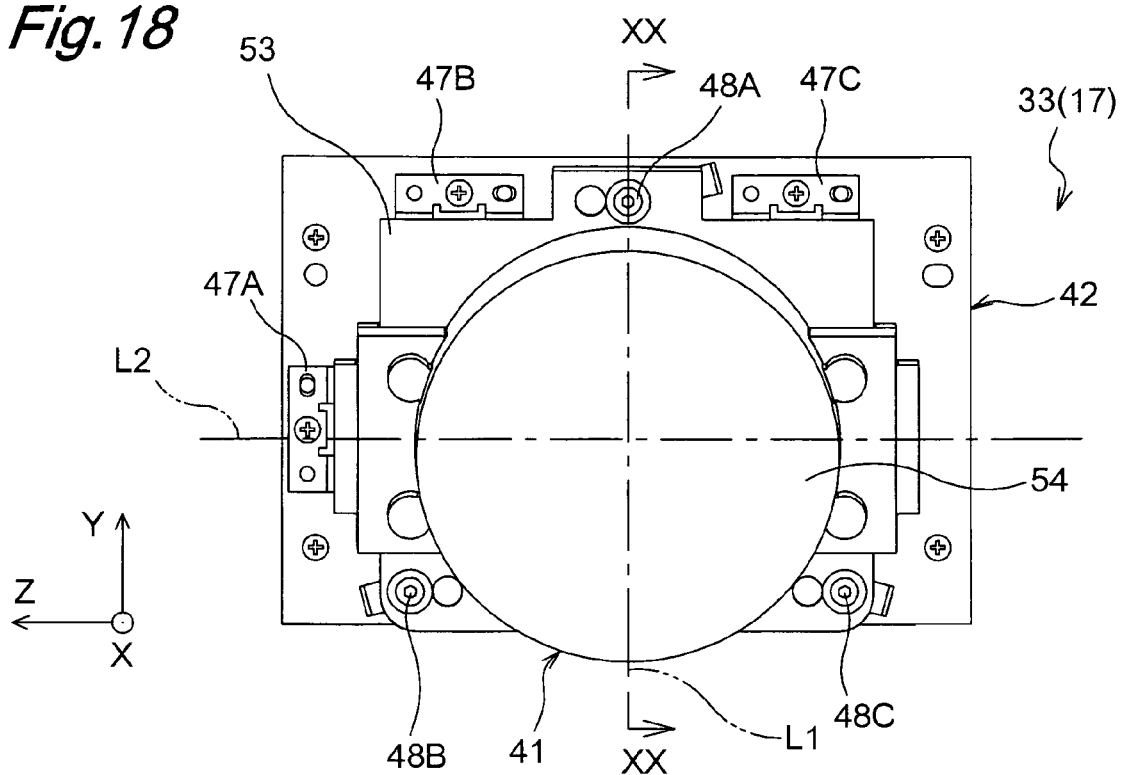
FIG. 18 is a rear view depicting a mirror holding mechanism of a concave mirror according to a fifth embodiment of the present invention.
Figure 19:
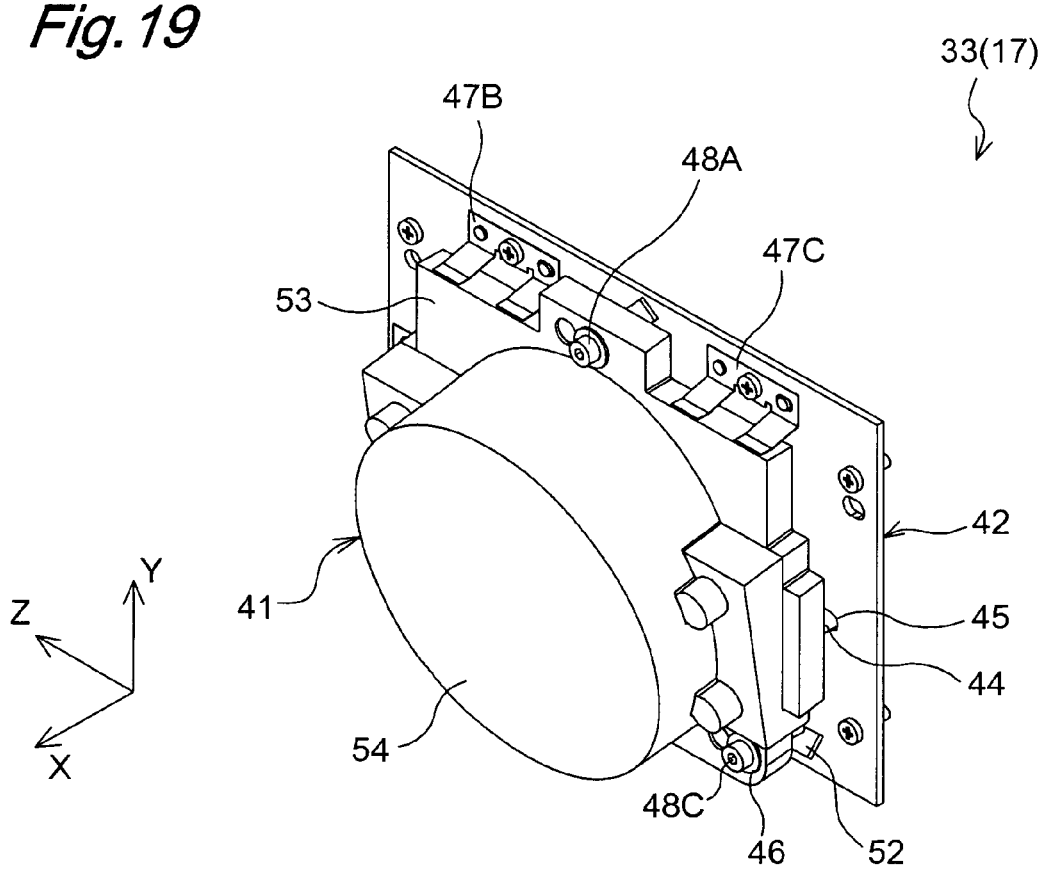
FIG. 19 is a rear side perspective view depicting the mirror holding mechanism of the concave mirror according to the fifth embodiment of the present invention.
Figure 20:
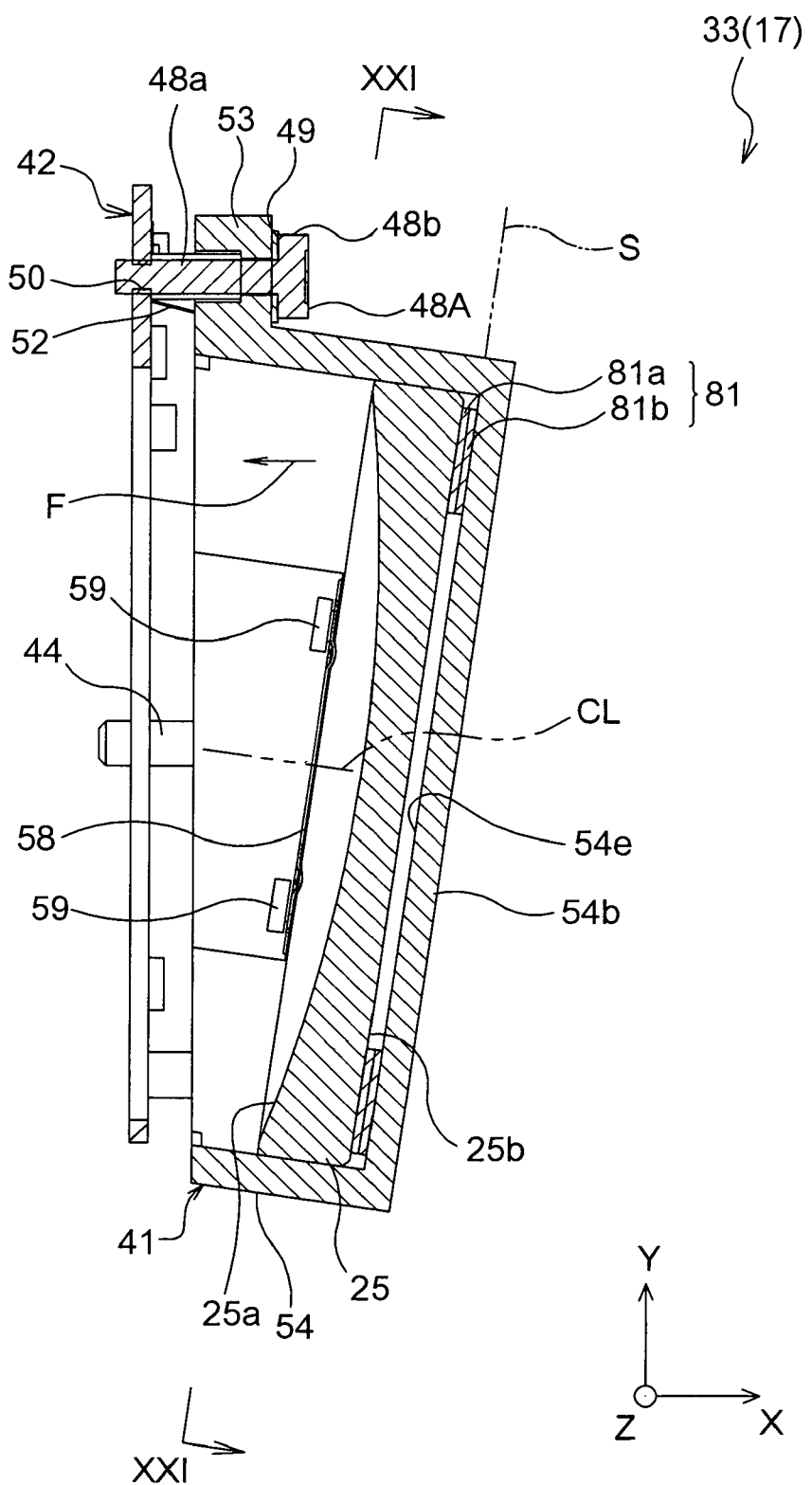
FIG. 20 is a cross-sectional view taken along a line XX-XX in FIG. 18.
Figure 21:
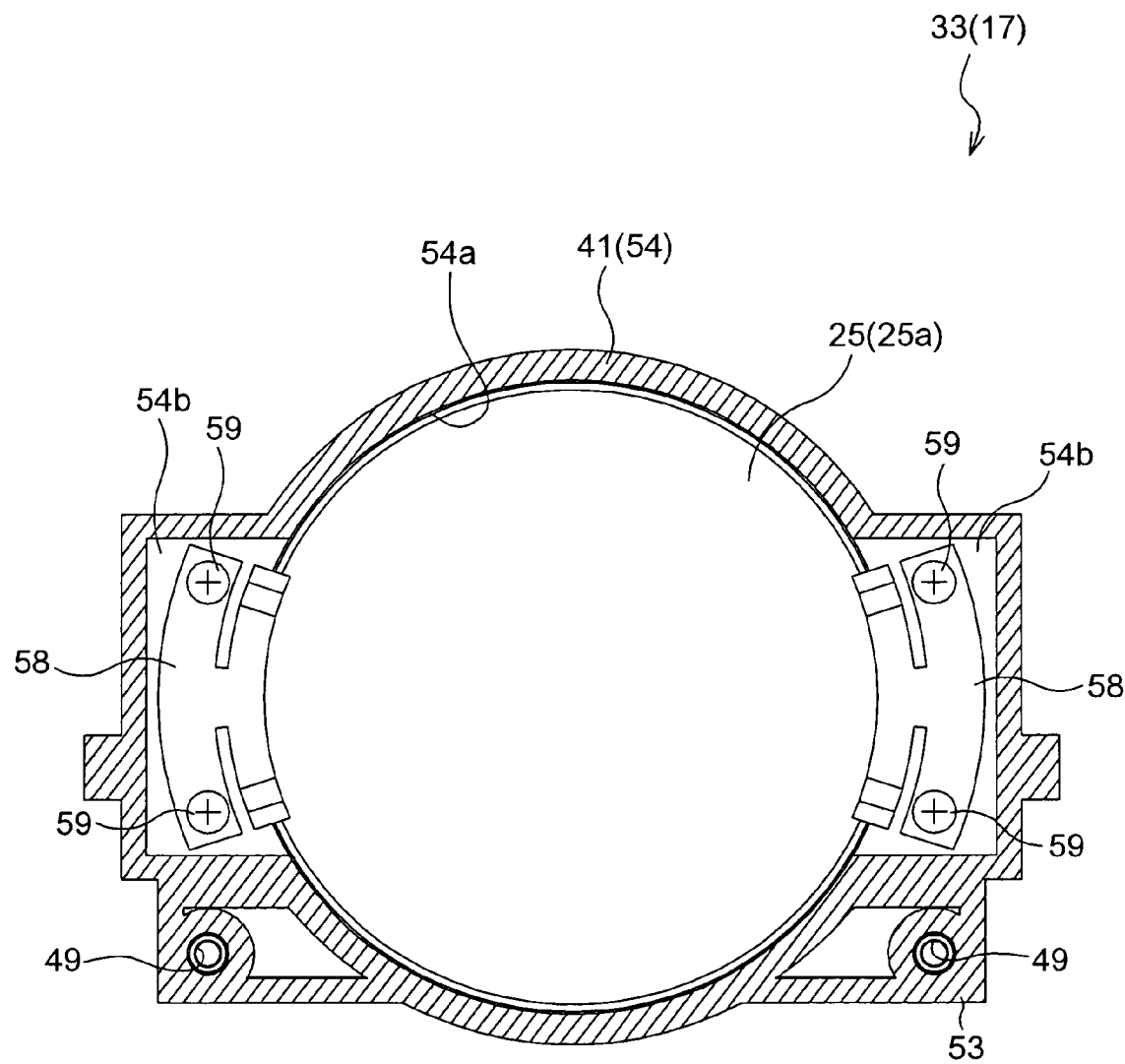
FIG. 21 is a cross-sectional view taken along a line XXI-XXI in FIG. 20.

FIG. 18 to FIG. 20 show the fifth embodiment of the present invention. In the present embodiment, the mirror holder 41 does not have the holding tube portion 55 (e.g. see FIG. 5). Between a back face 25b of a concave mirror 25 slidably held in the guide tube portion 54 and an inner face 54e of a closed end portion 54c of a guide tube portion 54 which functions as a reference plane S, a focus correction member 81, made of a bimetal, is disposed. The concave mirror 25 is urged to the reference plane S via the focus correction member 81 by the energizing force of a mirror retainer spring 58. The focus correction member 81, made of a bimetal in the present embodiment, has a flat thin ring shape, comprised of a low expansion member 81a and a high expansion member 81b, of which linear expansion coefficient is sufficiently higher than the low expansion member 81a, glued together. The focus correction member 81 may be a shape where the low expansion element 81 side is sunken.

When temperature rises, the focus correction element 81 changes from a flat shape to a shape where the low expansion member 81a side is sunken and the high expansion member 81b side is expanded. By this change of the shape, the thickness of the focus correction member 81 increases. As a result, the concave mirror 25 displaces in a direction away from the reference plane S, against the energizing force of the mirror retainer spring 58 (arrow F). By this displacement, the influence of the thermal expansion of the lower projection base 21, such as the increase of the distance between the DMD 13 and the concave mirror 25, is offset, and out of focus is corrected. If temperature drops down to the original temperature, the focus correction member 81, made of a bimetal, returns to the original flat shape, and the concave mirror 25 as well returns to the position before the temperature rise with respect to the reference plane S by the resilient urging force of the mirror retainer spring 58.

If a bimetal is used for the focus correction member 81, the dimensional increase amount (thickness increase amount) of the focus correction member 81, with respect to a temperature rise, can be increased. In other words, even if the thickness of the focus correction member 81 is relatively thin, a sufficient deformation amount is acquired at a temperature rise. Therefore by using a bimetal as the focus correction member 81, the focus correction member 81 can be compact and thin, and the mirror holding mechanism and the projection unit can be compact and slim accordingly.

Other configurations and functions of the fifth embodiment are the same as the first embodiment, so the same composing elements are denoted with the same reference symbols, and description thereof is omitted. In the second and third embodiments, a part or all of the focus correction members 57 and 61 may be comprised of a bimetal.

Sixth Embodiment

Figure 22:
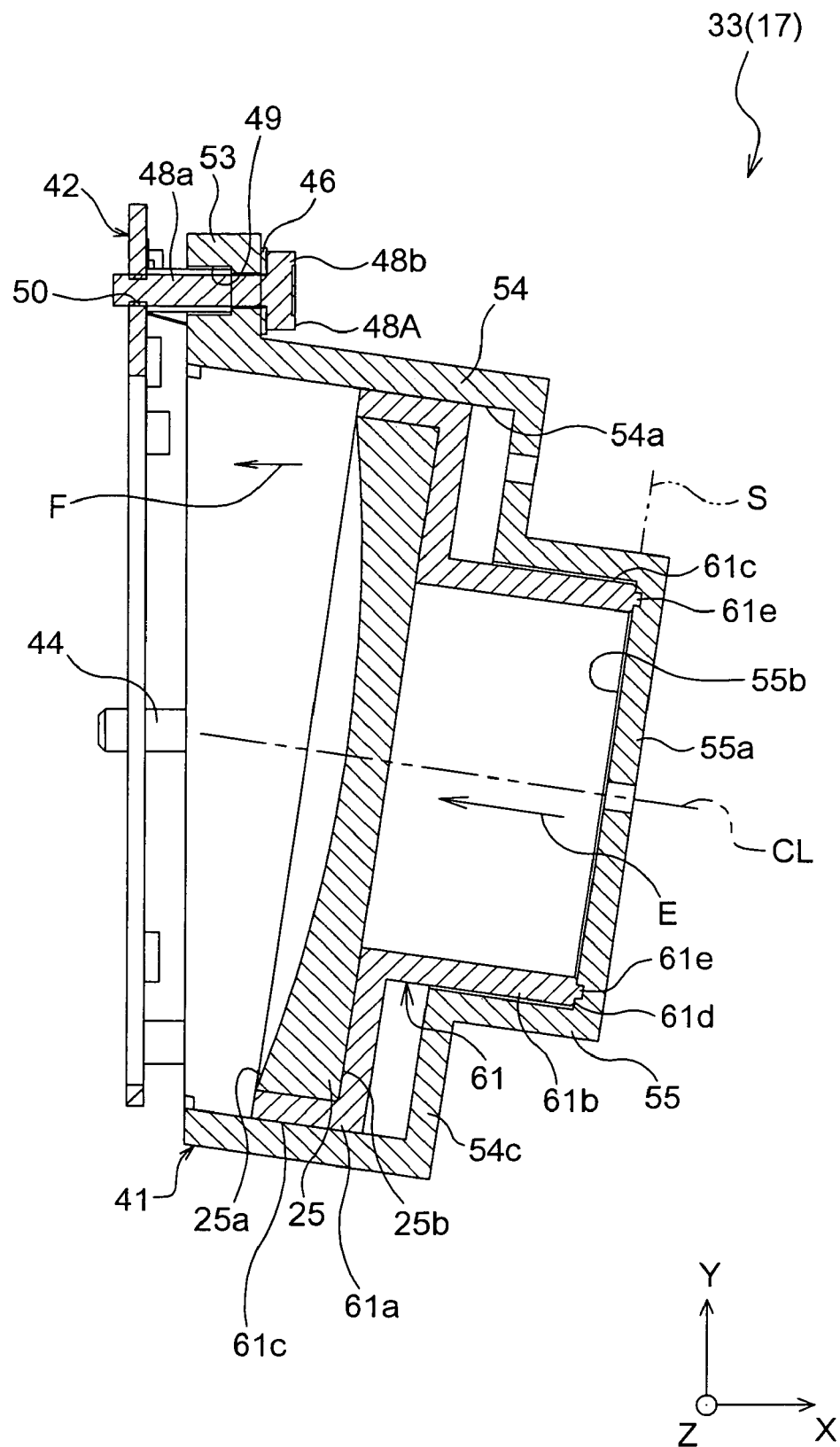
FIG. 22 is a longitudinal sectional view depicting a mirror holding mechanism of a concave mirror according to a sixth embodiment of the present invention.
Figure 23:
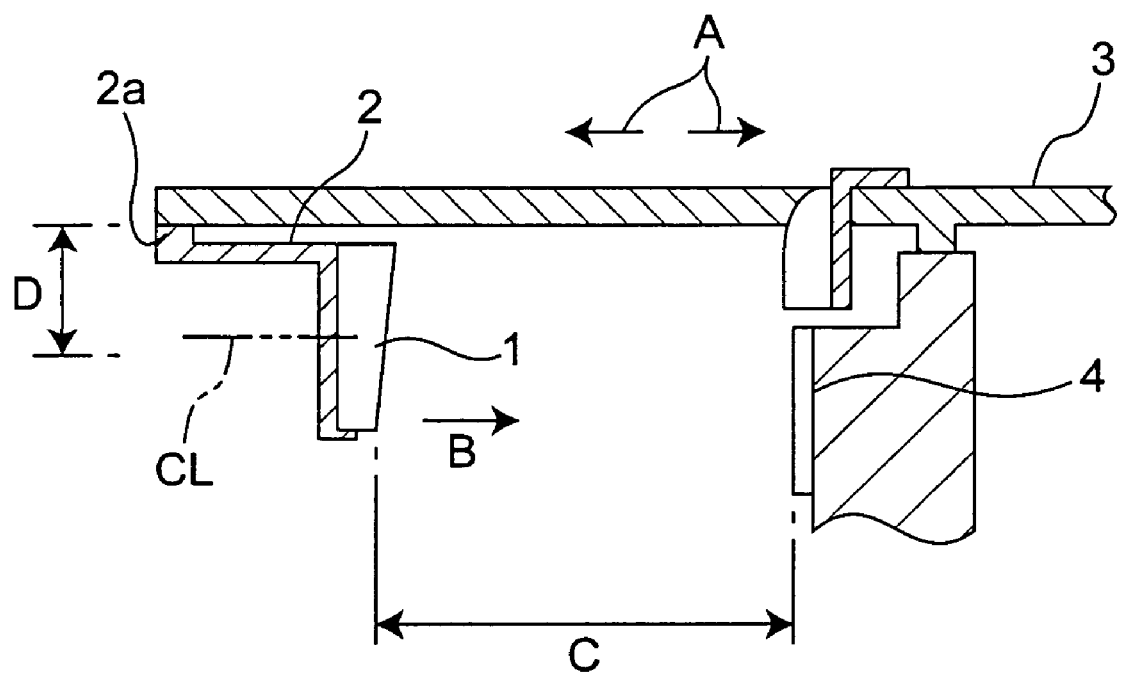
FIG. 23 is a cross-sectional view depicting a conventional projection unit.

FIG. 22 is a mirror holding mechanism 33 of the concave mirror 25 according to the sixth embodiment of the present invention. In the present embodiment, one end of a focus correction member 61 is secured to a mirror holder 41, and the other end is secured to a concave mirror 25. In a back end face 61*d* of a main portion 61*b* of the focus correction member 61, a ring shape protrusion 61*e* is formed, and this protrusion 61*e* is secured to a closed end portion 55*a* of the holding tube portion 55 by adhesion, for example. In other words, the back end face 61*d* side of the focus correction member 61 is secured to the mirror holder 41. The concave mirror 25 is housed in a mirror hosing portion 61*a* of the focus correction member 61, just like the second embodiment. The mirror retainer spring 58 and the screw 59 for securing the mirror retainer spring 58 (see FIG. 7) are not installed. In other words, unlike the first to the fifth embodiments, an urging member for urging the curved mirror 25 or the mirror holder 41 to the reference plane S is not installed.

When temperature rises, the length of the cylindrical focus correction member 61 in the axis direction increases by thermal expansion, and since the back end face 61*d* side of the focus correction member 61 is secured to the mirror holder 41, as mentioned above, the concave mirror 25 housed in the mirror hosing portion 61*a* of the focus correction member 61 displaces in a direction away from the reference plane S. When the temperature drops down to the original temperature, the length of the focus correction member 61 returns to the length before the temperature rise, and the concave mirror 25 also returns to the position before the temperature rise with respect to the reference plane S.

Even if the urging member for urging the concave mirror 25 or the mirror holder 41 to the reference plane S is omitted as in the sixth embodiment, the out of focus can be corrected by displacing the concave mirror 25 by changing the form of the focus correction member 61 at a temperature rise. The focus correction member 61 displaces the concave mirror 25 with respect to the reference plane S which is extended in a direction perpendicular to the center axis CL, so the displacement of the concave mirror 25 in a direction crossing the center axis CL at a temperature rise can be prevented.

For example, in the third embodiment (see FIG. 8 to FIG. 10), a configuration where one end of each focus correction member 71A to 71C is secured to the screw head 48*b* side of each male screw 48A to 48C, and the other end is secured to the mirror holder 41 side, and each spring 52A to 52C is omitted, may be used. In the case of this configuration, the length of each cylindrical focus correction member 71A to 71B increases by thermal expansion, and the mirror holder 41 (where the concave mirror 25 is secured) displaces in a direction away from the reference plane S. When the temperature drops down to the original temperature, the length of each focus correction member 71A to 71C returns to the length before the temperature rise, so the mirror holder 41 also returns to the position before the temperature rise with respect to the reference plane S. The same structure of the present embodiment can also be used by using a bimetal for the focus correction member, instead of resin.

The present invention is not limited to the above embodiments, but various modifications are possible. For example, the focus correction at a temperature rise may be performed using the structure of the embodiments for a mirror holding mechanism other than the curved mirror disposed facing the image formation device. The image formation device may be a reflection type image formation device other than DMD, a reflection type liquid crystal display device, for example, or a transmission type image formation device, such as a transmission type liquid crystal display device. The present invention was described above using a rear projection television, which is a rear projection type image display apparatus, but the present invention can be applied to a front projection type image display apparatus where an image is projected from the front of the screen, such as a video projector. The configuration of the optical system of the projection unit is not limited to the present embodiments. For example, the number of mirrors, layout of the spherical mirror, aspherical mirror, free-form curved mirror or surface shape of the curved mirror may be different.

In the projection unit according to the embodiment, the thermal deformation member is installed separately from the mirror holding member for holding the curved mirror, and out of focus is corrected by displacing the curved mirror by changing the form of the thermal deformation member at a temperature change. Since the structure and material of the thermal deformation member are not limited in terms of securing strength, such thermal deformation characteristics, such as the linear expansion coefficient, of the thermal deformation member can be set so as to secure the required correction amount, and out of focus can be effectively corrected. By using a structure of slidably holding the curved mirror in the guide tube portion of the mirror holding member directly, or via the mirror hosing portion of the thermal deformation member, the curved mirror can be secured to the projection base in a stable status where the curved mirror is not shaken very much by vibration and displacement other than displacement causing out of focus hardly occurs. In the same way, by using a structure of slidably supporting the mirror holding member securing the curved mirror by three or more rod members as well, the curved mirror can be secured to the projection base in a stable status where the curved mirror is not shaken very much by vibration and displacement other than displacement causing out of focus hardly occurs. Particularly by installing the first and second displacement restriction portions to prevent inclination of the rod members, disposition of the curved mirror can be prevented with certainty, and correction of out of focus with higher reproducibility and higher precision becomes possible.

What is claimed is:

1. A projection unit for enlarging and projecting an image light modulated by an image formation device comprising:
   a plurality of curved mirrors for reflecting the image light;
   a plurality of mirror holding mechanisms for holding the individual curved mirror respectively;
   a projection base on which the mirror hold mechanisms are installed;
   a reference plane for the mirror holding mechanism of one of the curved mirrors to be correction target, the reference plane being positioned with respect to the projection base and extending in a direction crossing a center axis of the curved mirror;

a thermal deformation member of which shape changes by a temperature rise, so that the curved mirror or a mirror holding member for holding the curved mirror is displaced to be distant from the reference plane by the change of the shape; and an urging member for urging the curved mirror to a back face side of the curved mirror toward the reference plane, wherein the mirror holding member comprises a guide tube portion for slidably holding the curved mirror on an inner face thereof, and the reference plane facing the back face of the curved mirror held by the guide tube portion, wherein the thermal deformation member is disposed between the back face of the curved mirror and the reference plane, and wherein the urging member urges the curved mirror and the thermal deformation member to the reference plane.

2. The projection unit according to claim 1, wherein the correction target curved mirror is disposed facing the image formation device.

3. The projection unit according to claim 1, wherein the image formation device is installed on the projection base.

4. A projection unit for enlarging and projecting an image light modulated by an image formation device comprising:
a plurality of curved mirrors for reflecting the image light;
a plurality of mirror holding mechanisms for holding the individual curved mirror respectively;
a projection base on which the mirror hold mechanisms are installed;
a reference plane for the mirror holding mechanism of one of the curved mirrors to be correction target, the reference plane being positioned with respect to the projection base and extending in a direction crossing a center axis of the curved mirror;
a thermal deformation member of which shape changes by a temperature rise, so that the curved mirror or a mirror holding member for holding the curved mirror is displaced to be distant from the reference plane by the change of the shape; and
an urging member for urging the curved mirror to a back face side of the curved mirror toward the reference plane,
wherein the thermal deformation member comprises a mirror hosing portion which is disposed in the mirror holding member and houses the curved mirror, and a main portion which extends from the mirror hosing portion to the back face side of the curved mirror,
wherein the mirror holding member comprises a guide tube portion for slidably holding the mirror hosing portion of the thermal deformation member on an inner face thereof, and the reference plane facing the back face of the curved mirror,
wherein the thermal deformation member is disposed in the mirror holding member so that the main portion is disposed between the mirror housing portion and the reference plane, and
wherein the urging member urges the curved mirror and the thermal deformation member to the reference plane.

5. A projection unit for enlarging and projecting an image light modulated by an image formation device comprising:
a plurality of curved mirrors for reflecting the image light;
a plurality of mirror holding mechanisms for holding the individual curved mirror respectively;
a projection base on which the mirror hold mechanisms are installed;

a reference plane for the mirror holding mechanism of one of the curved mirrors to be correction target, the reference plane being positioned with respect to the projection base and extending in a direction crossing a center axis of the curved mirror;
a thermal deformation member of which shape changes by a temperature rise, so that the curved mirror or a mirror holding member for holding the curved mirror is displaced to be distant from the reference plane by the change of the shape; and
an urging member for urging the mirror holding member housing the curved mirror to a back face side of the curved mirror toward the reference plane, and at least three rod members each of which comprises an axis portion which has a first external dimension, of which one end is secured to the projection base side, and which extends to the back face side of the curved mirror, and an enlarged portion which is disposed at the other end of the axis portion, which has a second external dimension larger than the first dimension, and on which the reference plane is formed,
wherein the mirror holding member, on which the curved mirror is secured, is slidably inserted through the axis portion of the rod member,
the thermal deformation member is inserted through the axis portion of the rod member between the mirror holding member and the reference plane, and
the urging member urges the mirror holding member and the thermal deformation member to the reference plane.

6. The projection unit according to claim 5, further comprising a first displacement restriction portion for restricting displacement in a direction crossing the axis line of the axis portion by one end of the thermal deformation member of which inner face closely and externally fits to the enlarged portion side of the axis portion of the rod member, and of which outer face is inserted through the axis portion.

7. The projection unit according to claim 6, wherein the first displacement restriction portion is integrated with the thermal deformation member.

8. The projection unit according to claim 5, wherein the mirror holding member comprises a second displacement restriction portion for restricting displacement of the other end of the thermal deformation member in a direction crossing the axis line.

9. The projection unit according to claim 5, wherein the mirror holding mechanism comprises an installation member which is directly installed on the projection base,
wherein the rod member is a male screw of which thread is the axis portion and screw head is the enlarged portion, and
wherein the thread of the male screw is engaged into a female screw formed in the installation member.

10. The projection unit according to claim 5, wherein a deformation quantity with respect to a temperature rise is different between at least two of the thermal deformation members.

11. The projection unit according to claim 1, wherein the thermal deformation member is made of a material of which linear expansion coefficient is $8 \times 10^{-5}$ (1/K) or more and $15 \times 10^{-5}$ (1/K) or less.

12. The projection unit according to claim 1, wherein the thermal deformation member is a bimetal.

13. The projection unit according to claim 4, wherein the correction target curved mirror is disposed facing the image formation device.

14. The projection unit according to claim 4, wherein the image formation device is installed on the projection base.

15. The projection unit according to claim 4, wherein the thermal deformation member is made of a material of which linear expansion coefficient is $8 \times 10^{-5}$ (1/K) or more and $15 \times 10^{-5}$ (1/K) or less.

16. The projection unit according to claim 4, wherein the thermal deformation member is a bimetal.

17. The projection unit according to claim 5, wherein the correction target curved mirror is disposed facing the image formation device.

18. The projection unit according to claim 5, wherein the image formation device is installed on the projection base.

19. The projection unit according to claim 5, wherein the thermal deformation member is made of a material of which linear expansion coefficient is $8 \times 10^{-5}$ (1/K) or more and $15 \times 10^{-5}$ (1/K) or less.

20. The projection unit according to claim 5, wherein the thermal deformation member is a bimetal.

* * * * *

UNITED STATES PATENT AND TRADEMARK OFFICE
CERTIFICATE OF CORRECTION

PATENT NO.        : 7,798,655 B2                                       Page 1 of 1
APPLICATION NO.   : 11/823244
DATED             : September 21, 2010
INVENTOR(S)       : Atsushi Matsuura and Shinichi Suzuki It is certified that error appears in the above-identified patent and that said Letters Patent is hereby corrected as shown below:

Column 2:
Lines 60 and 63, delete "hosing" and insert -- housing --.

Column 3:
Lines 4, 15 and 17, delete "hosing" and insert -- housing --.

Column 11:
Lines 29, 31, 32, 34, 36, 44, 53, 61 and 67, delete "hosing" and insert -- housing --.

Column 19:
Lines 26 and 38, delete "hosing" and insert -- housing --.

Column 20:
Line 38, delete "hosing" and insert -- housing --.

Column 21:
Lines 46, 48 and 51, printed claim 4, delete "hosing" and insert -- housing --.

Signed and Sealed this
Twenty-eighth Day of December, 2010

David J. Kappos
*Director of the United States Patent and Trademark Office*